(12) United States Patent
McClellan

(10) Patent No.: US 7,994,674 B2
(45) Date of Patent: Aug. 9, 2011

(54) FLUX-FOCUSED SHAPED PERMANENT MAGNET, MAGNETIC UNIT HAVING THE MAGNETS, DEVICE HAVING THE MAGNETIC UNITS AND METHOD FOR ASYMMETRICALLY FOCUSING FLUX FIELDS OF PERMANENT MAGNETS

(76) Inventor: W. Thomas McClellan, Fort Lauderdale, FL (US)

( * ) Notice: Subject to any disclaimer, the term of this patent is extended or adjusted under 35 U.S.C. 154(b) by 159 days.

(21) Appl. No.: 12/020,024

(22) Filed: Jan. 25, 2008

(65) Prior Publication Data

US 2009/0189470 A1    Jul. 30, 2009

(51) Int. Cl.
*H02K 21/26* (2006.01)
*H02K 21/38* (2006.01)
*H02K 23/04* (2006.01)
*H02K 21/12* (2006.01)

(52) U.S. Cl. ......... 310/154.21; 310/154.22; 310/154.23; 310/154.24; 310/154.25; 310/156.01

(58) Field of Classification Search ............. 310/154.29, 310/155.01, 154.38–39, 154.43, 154.51, 310/154.21–25, 89, 162, 259, 156.44–156.45, 310/181, 156.01; 607/1
See application file for complete search history.

(56) References Cited

U.S. PATENT DOCUMENTS

| | | | | |
|---|---|---|---|---|
| 4,924,130 | A | * | 5/1990 | Fratta ...................... 310/156.53 |
| 5,959,758 | A | * | 9/1999 | Seo ............................ 359/198.1 |
| 6,025,667 | A | | 2/2000 | Narita et al. |
| 6,107,793 | A | * | 8/2000 | Yokotani et al. ......... 324/207.21 |
| 6,703,829 | B2 | * | 3/2004 | Tola ......................... 324/207.25 |
| 6,707,446 | B2 | * | 3/2004 | Nakamura et al. ............ 345/160 |
| 7,148,680 | B2 | * | 12/2006 | Mizutani et al. ......... 324/207.25 |
| 7,250,702 | B2 | | 7/2007 | Abou Akar et al. |
| 2002/0050902 | A1 | | 5/2002 | Asano et al. |
| 2003/0178103 | A1 | * | 9/2003 | Harimoto et al. ............. 148/105 |
| 2004/0064153 | A1 | * | 4/2004 | Creighton et al. ................ 607/1 |

OTHER PUBLICATIONS

International Search Report and written opinon dated Aug. 12, 2009.

* cited by examiner

*Primary Examiner* — Quyen Leung
*Assistant Examiner* — Jose A Gonzalez Quinones
(74) *Attorney, Agent, or Firm* — Laurence A. Greenberg; Werner H. Stemer; Ralph E. Locher

(57) ABSTRACT

A flux-focused, shaped permanent magnet includes a body of magnetic material having multiple surface contouring to form a reduced flux side with convex surfaces and an increased flux side with concave surfaces. The surfaces develop high and low resistance external flux paths creating focused asymmetric flux fields. A magnetic unit having the shaped permanent magnet and a magnetic flux attracter or two shaped permanent magnets interconnected by two segmented permanent magnets and a kinetic device having a stationary stator ring, a rotor disc rotating within the stator ring and a multiplicity of the magnetic units on the stator ring and the rotor disc, are also provided.

8 Claims, 26 Drawing Sheets

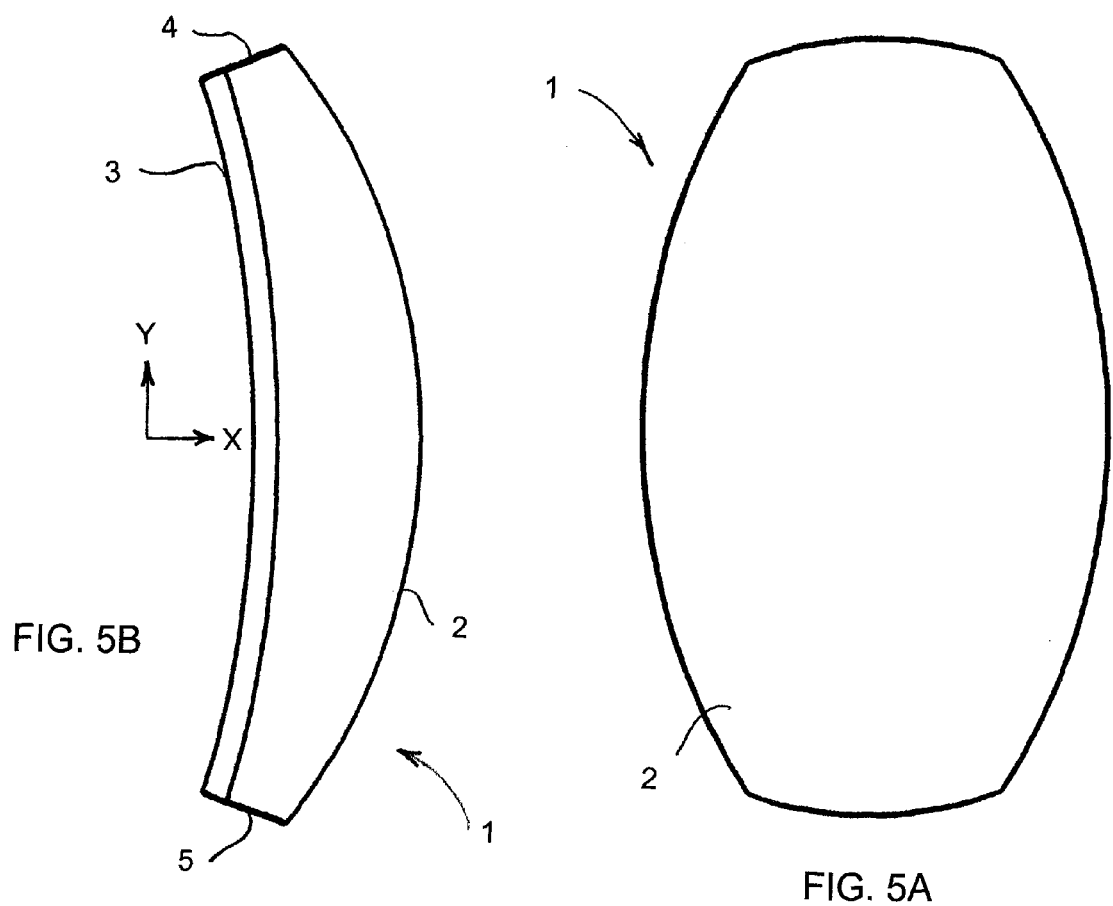
FIG. 5B
FIG. 5A
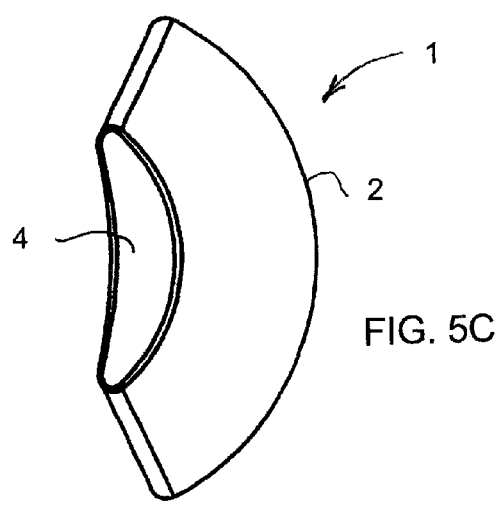
FIG. 5C

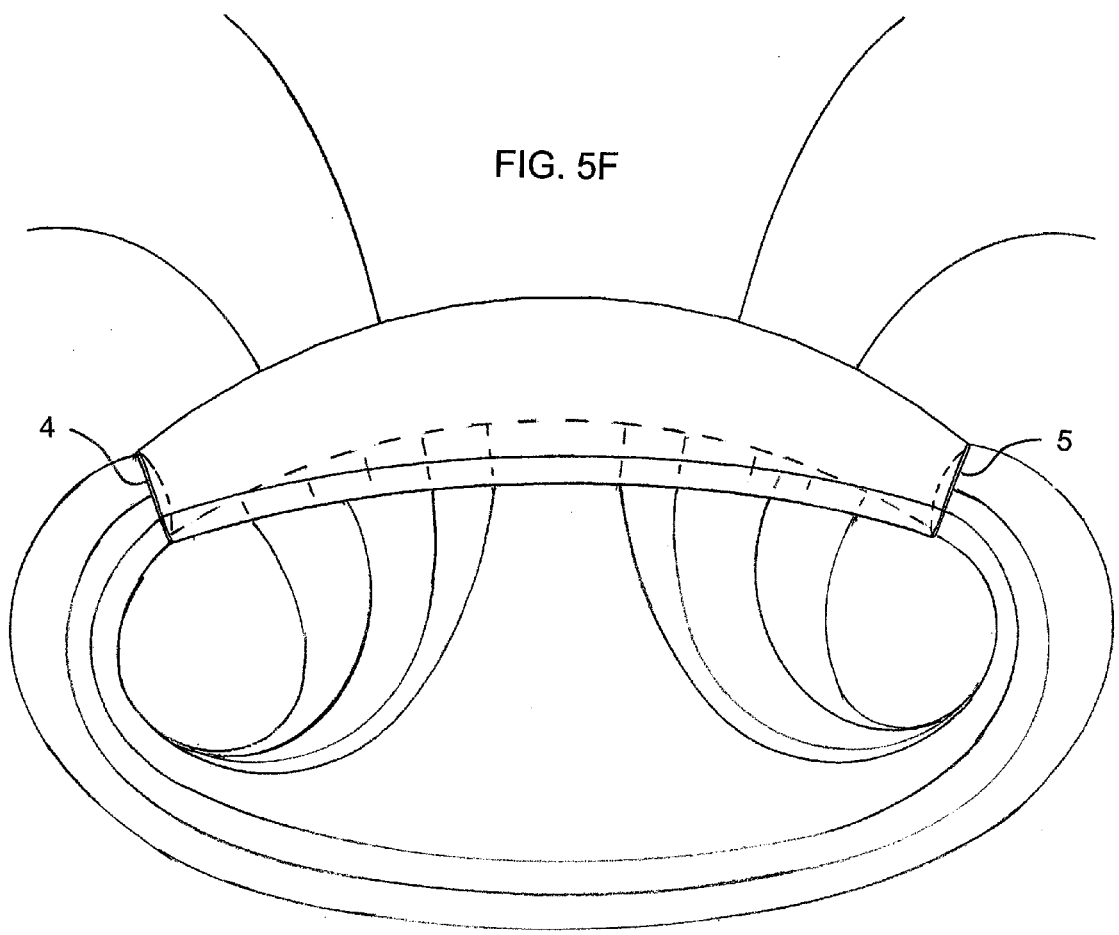
FIG. 5F
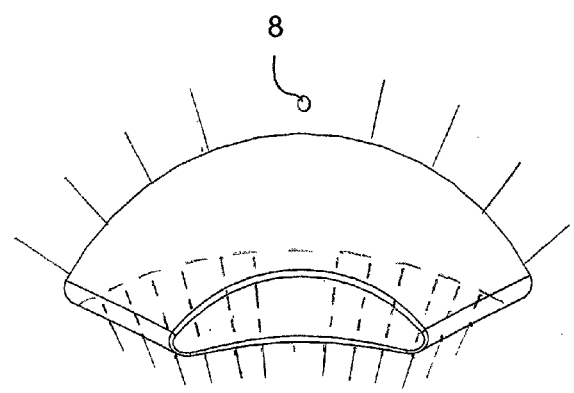
FIG. 5G
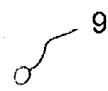

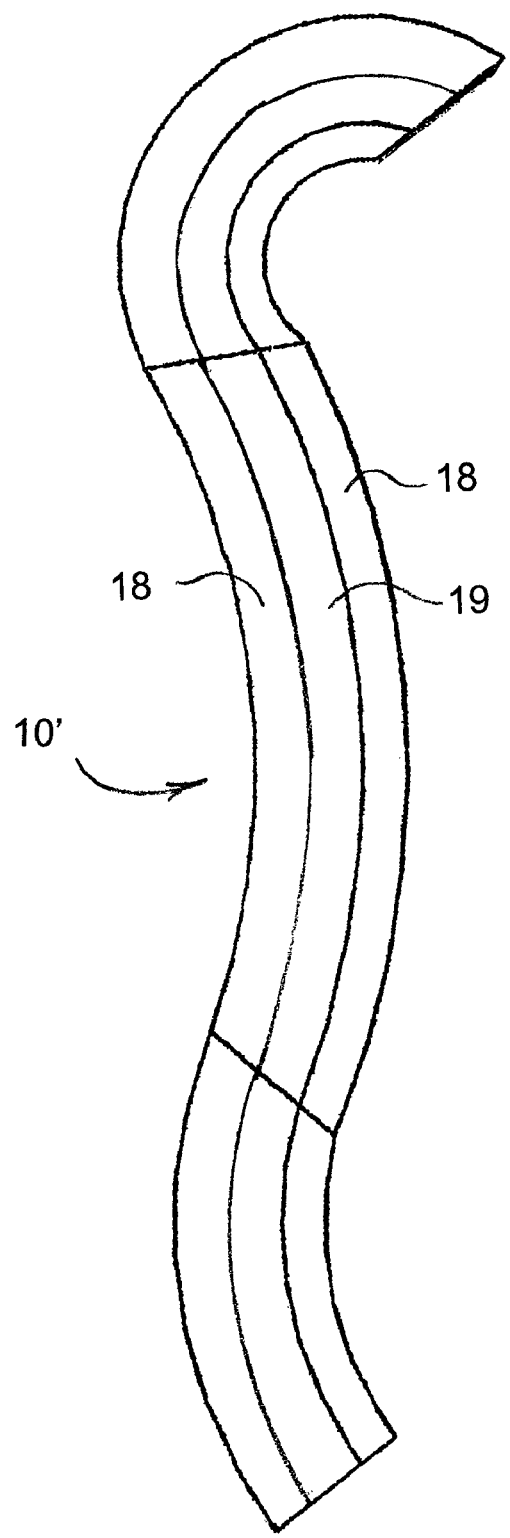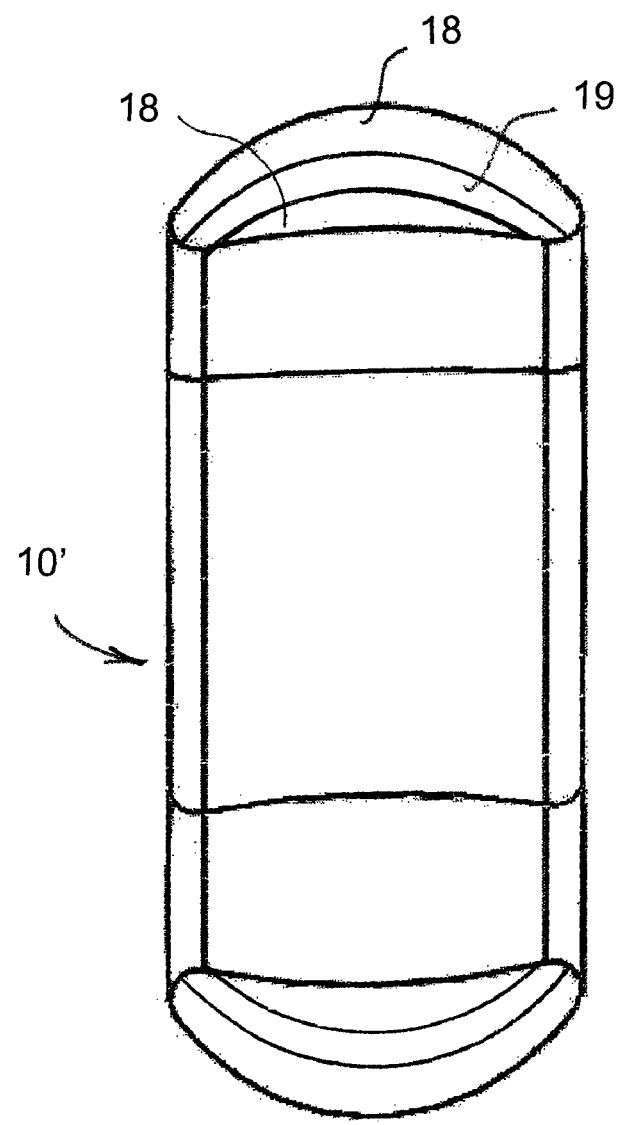
FIG. 6E
FIG. 6F

FLUX-FOCUSED SHAPED PERMANENT MAGNET, MAGNETIC UNIT HAVING THE MAGNETS, DEVICE HAVING THE MAGNETIC UNITS AND METHOD FOR ASYMMETRICALLY FOCUSING FLUX FIELDS OF PERMANENT MAGNETS

BACKGROUND OF THE INVENTION

1. Field of the Invention

The invention relates to a flux-focused, shaped permanent magnet. The invention also relates to a magnetic unit having the magnets, a device having the magnetic units and a method for asymmetrically focusing flux fields of permanent magnets.

2. Description of the Related Art

Permanent magnets are constrained in their usefulness by their symmetric flux fields. Their pole forces are self-neutralizing because of their symmetry, as it takes as much energy to force like poles together as they give back in repulsion.

Asymmetric or focused field magnets such as electro-magnets have easily harnessed field differences and permanent magnets could have improved usefulness if created with asymmetric or unequal flux fields.

SUMMARY OF THE INVENTION

It is accordingly an object of the invention to provide a flux-focused shaped permanent magnet, a magnetic unit having the magnets, a device having the magnetic units and a method for asymmetrically focusing flux fields of permanent magnets, which overcome the hereinafore-mentioned disadvantages of the heretofore-known devices and of this general type and which permit improved use of the magnetic flux fields of permanent magnets based on altering the shape and contour of the magnet itself to create a usable flux field asymmetry. Flux asymmetry creates force field differences and these differences in forces can be harnessed. This emitted flux energy can be focused in one preferred direction by reducing the emissions in other directions, keeping the total emitted energy constant.

With the foregoing and other objects in view there is provided, in accordance with the invention, a flux-focused, shaped permanent magnet, comprising a body of magnetic material having multiple surface contouring to form a reduced flux side with convex surfaces and an increased flux side with concave surfaces. The surfaces develop high and low resistance external flux paths creating focused asymmetric flux fields.

With the objects of the invention in view, there is also provided a magnetic unit, comprising a flux-focused, shaped permanent magnet having a body of magnetic material with surface contouring to form a reduced flux side with a convex surface and an increased flux side with a concave surface. The surfaces develop high and low resistance external flux paths creating focused asymmetric flux fields, and the body has two magnet pole end surfaces. A magnetic flux attracter formed of highly permeable material has two end surfaces. One of the end surfaces of the magnetic flux attracter contacts one of the end surfaces of the shaped permanent magnet, causing magnetic field lines to extend between the other of the end surfaces of the magnetic flux attracter and the other of the end surfaces of the shaped permanent magnet.

With the objects of the invention in view, there is additionally provided a magnetic unit, comprising two flux-focused, shaped permanent magnets each having a body of magnetic material with surface contouring to form a reduced flux side with a convex surface and an increased flux side with a concave surface. The surfaces develop high and low resistance external flux paths creating focused asymmetric flux fields, and the body has two magnet pole end surfaces. Two segmented permanent magnets together interconnect one of the end surfaces of each of the shaped permanent magnets.

With the objects of the invention in view, there is furthermore provided a kinetic device, comprising a stationary stator ring, a rotor disc rotating within the stator ring and defining mutually rotating surfaces therebetween and a multiplicity of the magnetic units according to the invention disposed on the rotor disc and on the stator ring. The magnetic units on the rotor disc and on the stator ring are disposed opposite each other about the mutually rotating surfaces. The other of the end surfaces of the magnetic flux attracter and the other of the end surfaces of the shaped permanent magnet of each of the magnetic units face the mutually rotating surfaces.

With the objects of the invention in view, there is alternatively provided a kinetic device, comprising a stationary stator ring, a rotor disc rotating within the stator ring and defining mutually rotating surfaces therebetween and a multiplicity of the magnetic units according to the invention disposed on the rotor disc and on the stator ring. The magnetic units on the rotor disc and on the stator ring are disposed opposite each other about the mutually rotating surfaces and the other of the end surfaces of each of the shaped permanent magnets of each of the magnetic units face each other.

With the objects of the invention in view, there is concomitantly provided a method for asymmetrically focusing flux fields of permanent magnets. The method comprises surface contouring a body of magnetic material to form a reduced flux side with convex surfaces and an increased flux side with concave surfaces. High and low resistance external flux paths are developed with the surfaces to create focused asymmetric flux fields.

Other features which are considered as characteristic for the invention are set forth in the appended claims.

Although the invention is illustrated and described herein as embodied in a flux-focused shaped permanent magnet, a magnetic unit having the magnets, a device having the magnetic units and a method for asymmetrically focusing flux fields of permanent magnets, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIGS. 5A-5E are respective top-plan, side-elevational, end-perspective, side-perspective and top-perspective views of a shaped permanent magnet with focused flux according to the invention;

FIGS. 5F-5G are respective views similar to FIGS. 5B and 5C, rotated through 90° and showing the lines of magnetic flux developed by the shaped permanent magnet;

FIGS. 6E-6F are respective bottom-plan and side-elevational views of an alternative embodiment of a flux attracter formed of magnetically attracting permeable material and electrically insolated and magnetically separated layers;

DETAILED DESCRIPTION OF THE INVENTION

Figure 1:
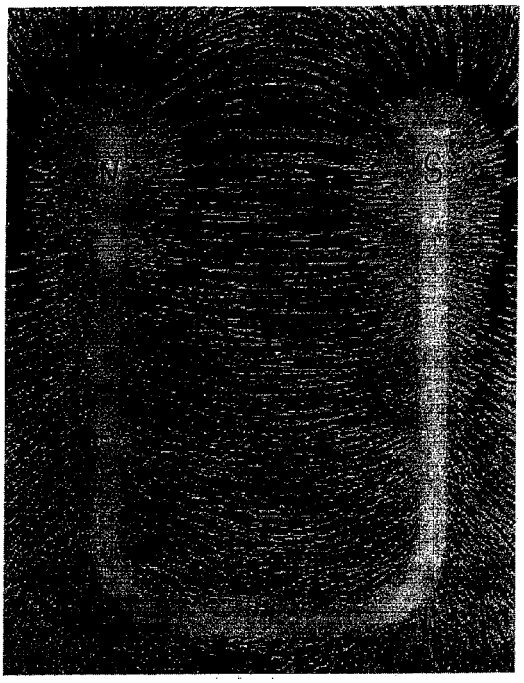
FIG. 1 is a photograph of a prior art U-shaped or so-called horseshoe magnet and its magnetic field.
Figure 2:
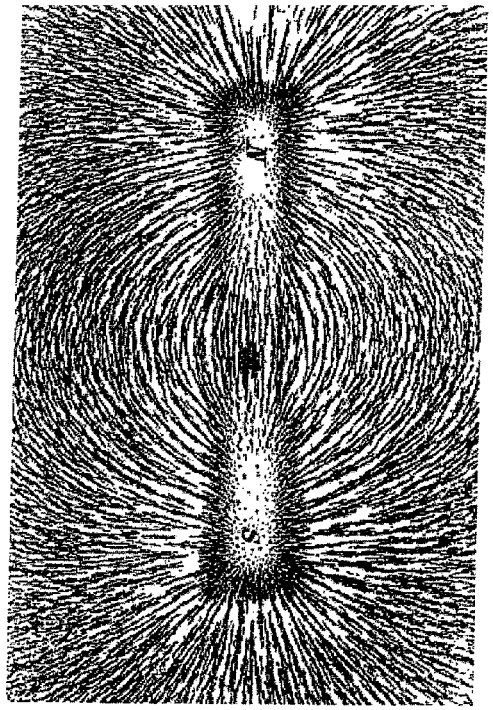
FIG. 2 is a photograph of a prior art rectangular or so-called bar magnet and its magnetic field.
Figure 4:
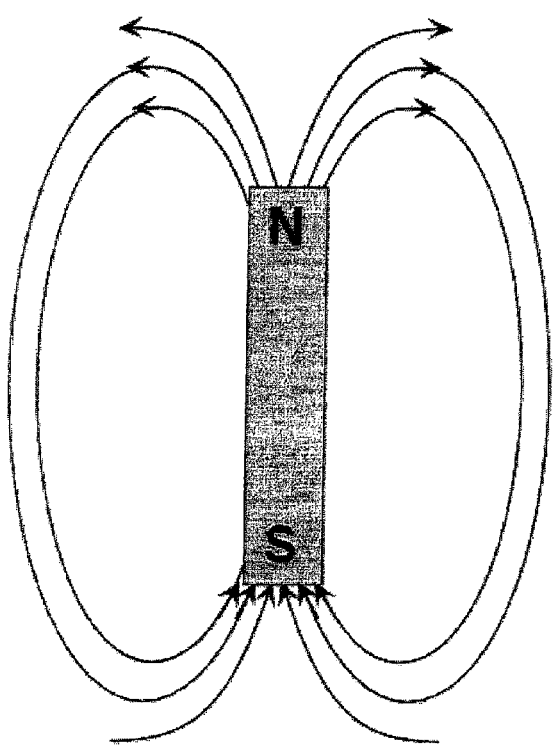
FIG. 4 is a top-plan view of a prior art bar magnet indicating its direction of magnetic flux or field vector.
Figure 3:
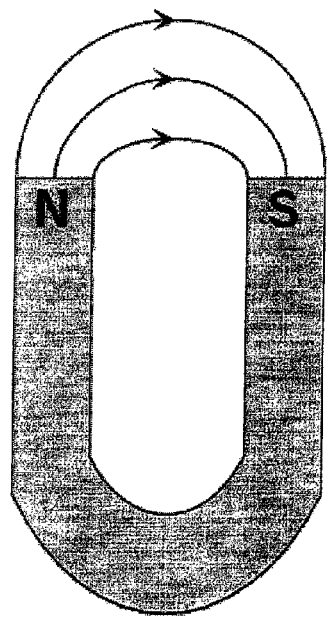
FIG. 3 is a diagrammatic, top-plan view of a prior art horseshoe magnet indicating its direction of magnetic flux or field vector.
Figure 5D:
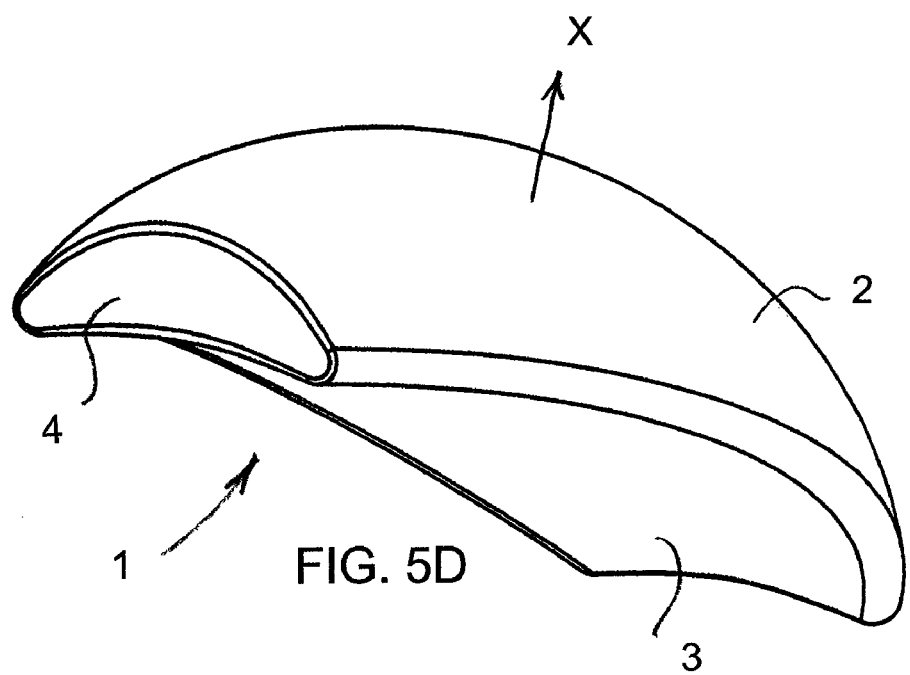
Figure 5E:
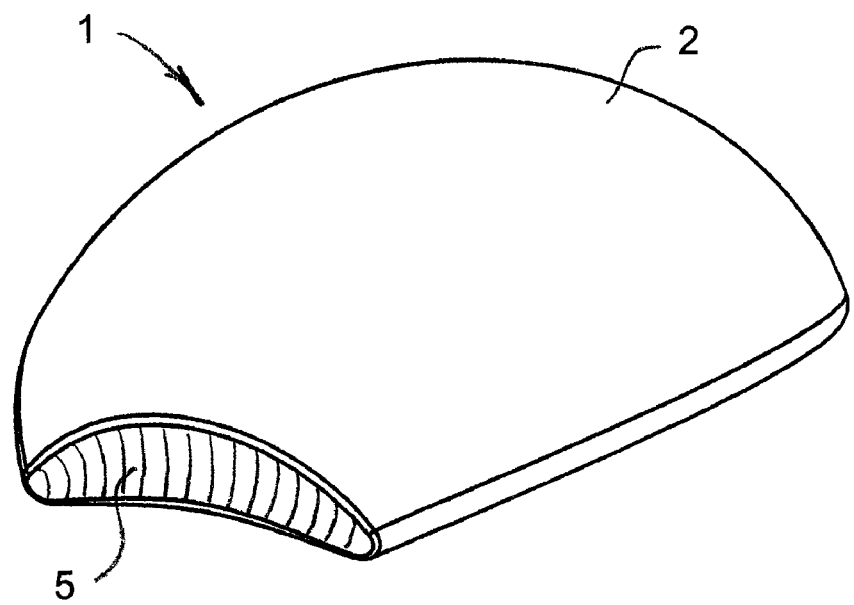
Figure 6A:
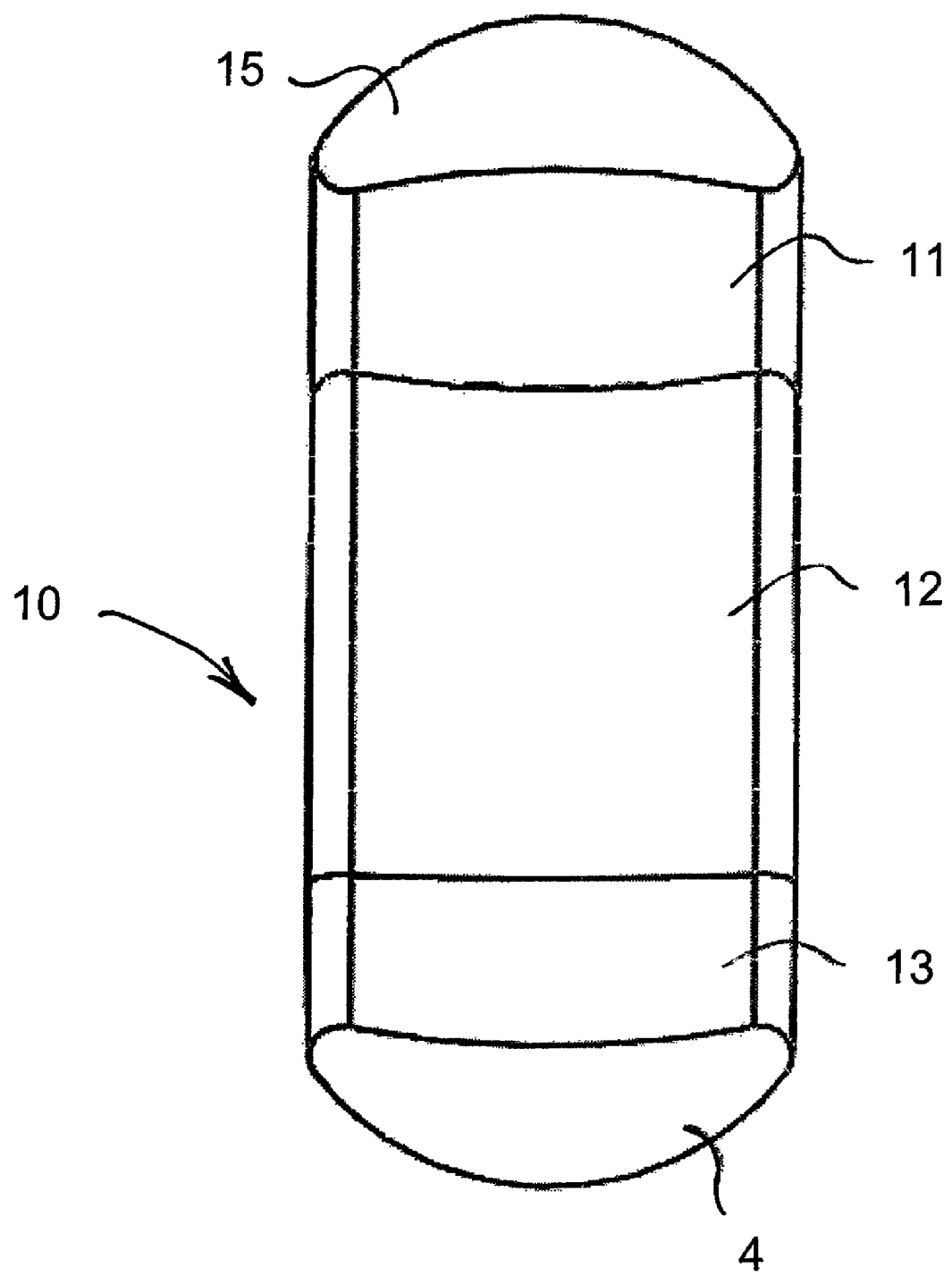
FIGS. 6A-6D are respective bottom-plan, side-elevational, side-perspective and bottom-perspective views of a flux attracter according to the invention.
Figure 6B:
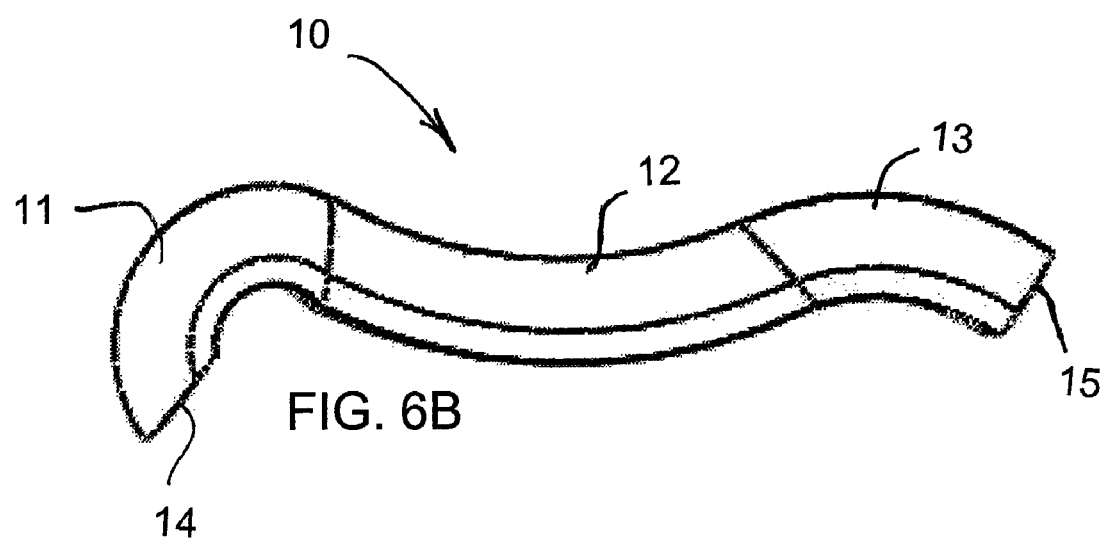
Figure 6C:
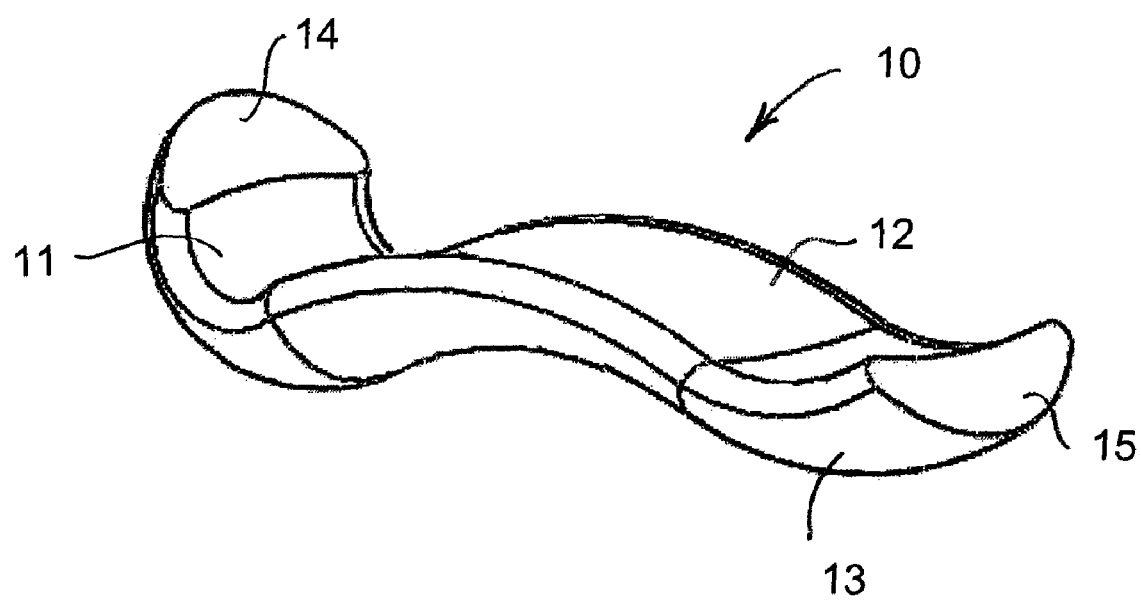
Figure 6D:
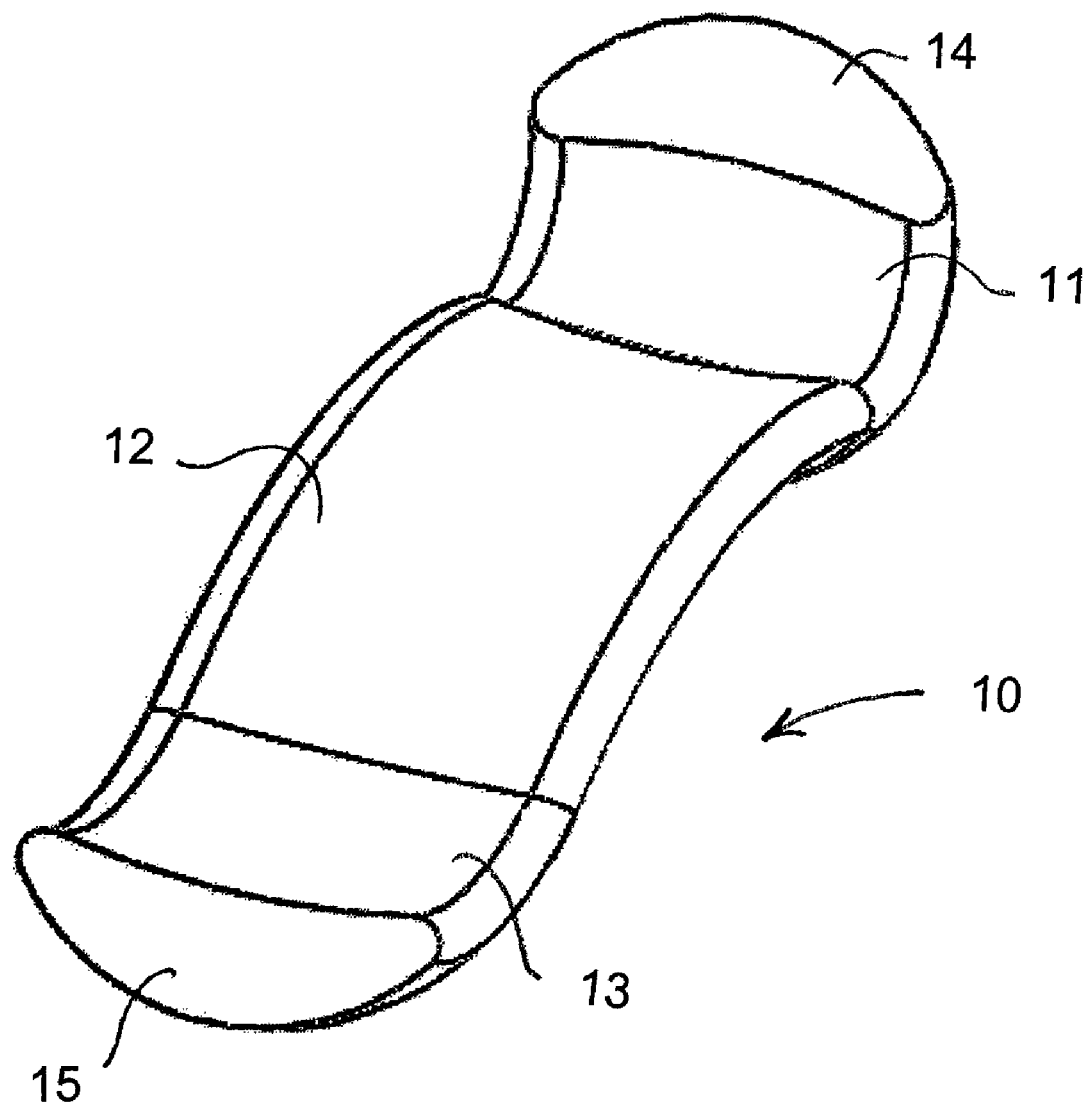

Referring now to the figures of the drawings in detail and first, particularly, to FIG. 1 thereof, there is seen a photograph of a U-shaped or horseshoe permanent magnet having north and south poles at ends of the legs of the U and lines of induction in a pattern indicating a magnetic filed between the poles. Such lines may be illustrated by sprinkling iron filings on a piece of paper placed over the magnet. Similarly, FIG. 2 shows a rectangular or bar magnet having north and south poles at its ends and lines of induction indicating a magnetic field between the poles. FIG. 3 diagrammatically illustrates the horseshoe magnet of FIG. 1, the north pole N, south pole S and the direction of magnetic flux or field vector from the north pole to the south pole. In a similar manner, FIG. 4 diagrammatically illustrates the bar magnet of FIG. 2, the north pole N, south pole S and the direction of magnetic flux or field vector from the north pole to the south pole. Another non-illustrated but common shape is a ring magnet, which is often used in computer memory cores. Round bars, donuts, disks, multi-fingered rings, kidney and trapezoid are also known magnet shapes. Other shapes can be made by casting in a mold and grinding or pressing powder into a mold, pressure bonding or sintering.

It is known that the lines of induction originate at the north pole and end at the south pole. Their direction is the direction of the magnetic field and the number of lines in an area represents their density and the strength of the magnetic field. Since the lines converge near the poles, the field is strongest there. It is also known that the strength of a permanent magnet may be increased by placing the poles closer together, such as in a horseshoe magnet as compared to a bar magnet. Magnetic fields follow the shape of the emitter, within certain limits, and the shape of these fields can be altered by changing the shape or form of the emitting magnet, as seen in FIGS. 1-4.

Although the placement of a nonmagnetic material in a magnetic field will have no effect on the flux, the placement of a magnetic material, such as highly permeable soft iron, in a magnetic field will redirect the flux.

FIGS. 5A-5E illustrate a shaped permanent magnet 1 according to the invention, which produces an asymmetric flux field. The shaped magnet has a body with a reduced flux side having a convex surface 2 and an increased flux side having a concave surface 3, produced by controlled curving and tapering of the shape of the magnet, off-centering the center of magnetic mass, surface contouring, selectively creating opposing longer or shorter external flux paths and/or selectively creating opposing high and low resistance external flux paths and other features implemented according to the invention, which are used for the specific purpose of creating useable, differentially focused, asymmetric flux fields in permanent magnets. The changing of magnetic shapes for other reasons is not within the intent of or comparable to the invention.

As is seen in FIG. 5B, on the desired reduced flux side with the convex surface 2, total surface transverse and lengthwise convex curvatures are used. This curving contour and lengthening causes the flux force or flux lines to be directionally defocused, diffused, spread and decreased in intensity. The flux intensity in both the transverse and lengthwise x and y axes is reduced. The flux path length on this reduced flux side, in both the x and y axes, is much longer and an increasing path length increases flux resistance and decreases flux intensity.

On the desired increased flux side with the concave surface 3, matching double axis or x-y total surface transverse and lengthwise concave curvatures are used to shorten the flux path on this side in both axes and concentrate the flux density by directionally focusing and directing the field in converging vectors toward a focal point off of this preferred flux side in both the x and y axes. The flux path shortening and concentrating focus yields increased flux density and field asymmetry which can be harnessed.

Two magnet pole end surfaces 4, 5 may also be formed with additional angulation and focusing, in the x and y axes, with surfaces being concave in one or both directions and angled toward the increased or strong flux side to further improve field asymmetry and directional flux projection and with extension of the flux farther from the surface, as seen in FIGS. 5A-E.

FIGS. 5F-5G show the lines of magnetic flux developed by the shaped permanent magnet. At the top of FIG. 5F, the flux lines are weakened, spread apart and join the magnet in perpendicular direction. The flux lines leave the sides 4, 5 of the magnet in an aligned manner, are focused, strengthened and concentrated about a main axis at the bottom and have a focal point 8. FIG. 5G similarly shows the flux lines spread apart at the top and concentrated at the bottom toward a focal point 9.

FIGS. 6A-6D illustrate a magnetic flux attracter 10, which is highly permeable. A highly permeable material is one which can be easily magnetized. The highly permeable magnetic flux field attracting material may be a nickel-iron-cobalt alloy or mu metal (nickel, iron, copper, molybdenum alloy), which is thousands of times more attracting to magnetic flux than air. The attracter 10 may be formed as a separate flux attracter which is an assembled element further attracting flux to the increased flux side and further increasing field asymmetry.

In the illustrated embodiment, the attracter 10 has a first end section 11, a middle section 12 and a second end section 13, as well as end surfaces 14 and 15. All three sections are curved to greater or lesser degrees to form a desired shape of a magnetic unit, which will be discussed in detail below.

According to an alternative embodiment shown in FIGS. 6E and 6F, an attracter 10' is formed of magnetically attracting permeable material layers 18 and electrically isolated or insulated and magnetically separated layers 19 (for example with neutral magnetic layers such as paper) in lengthwise laminations to increase element surface area for improved passage of high magnetic flux densities which flow more efficiently on or near the surfaces of the permeable material rather than within the material. Although only three layers are shown, five or more may be used. The permeable material is not used as a containment channel.

Figure 7A:
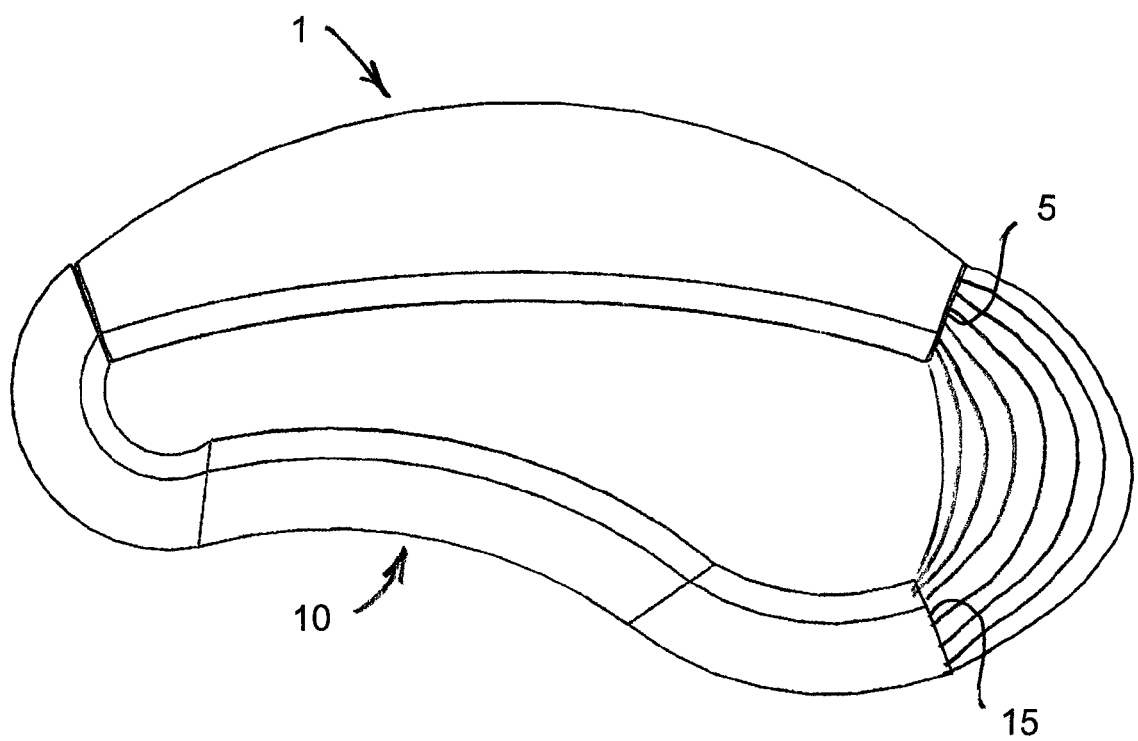
FIGS. 7A-7B are respective side-elevational and bottom-perspective views of an assembly of the shaped permanent magnet as seen in FIG. 5B and the flux attracter as seen in FIG. 6B.
Figure 7B:
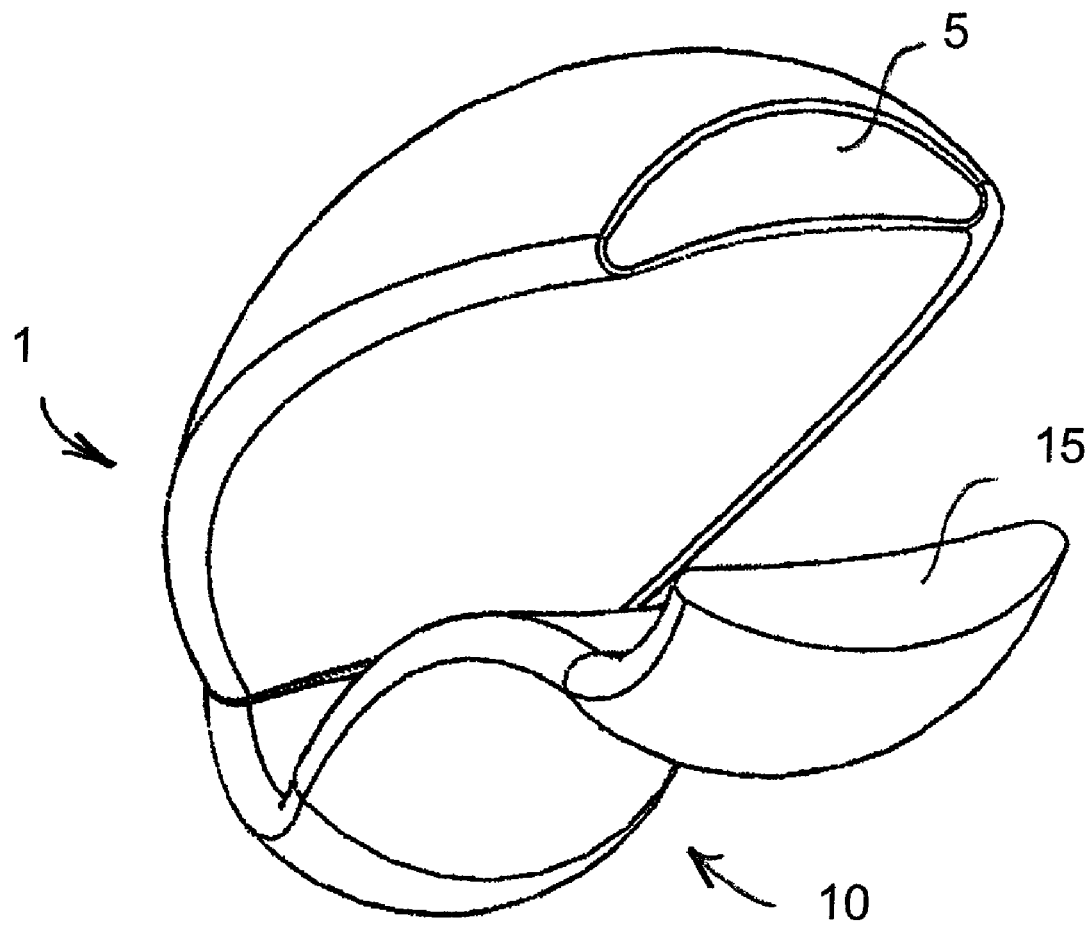

FIGS. 7A and 7B show an assembly of the shaped permanent magnet 1 of FIGS. 5A-5E and the flux attracter 10 of FIGS. 6A-6D. The lines of the magnetic field extend between the poles of the assembly, which in this case are defined by the surfaces 5 and 15.

Figure 8:
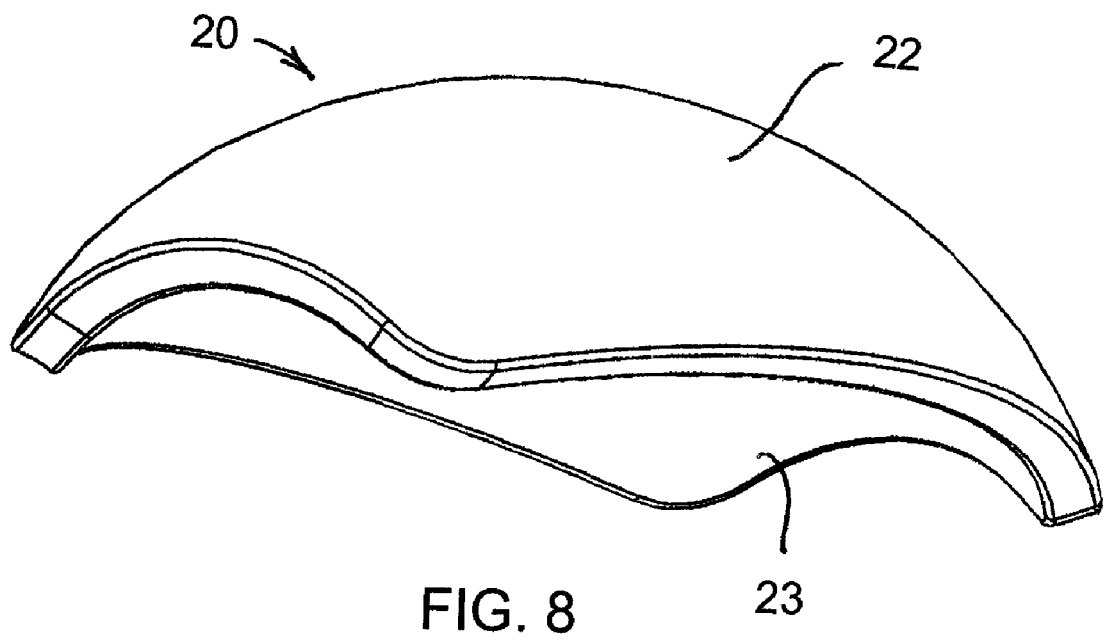
FIG. 8 is a side-perspective view of a dimagnetic cover.
Figure 9A:
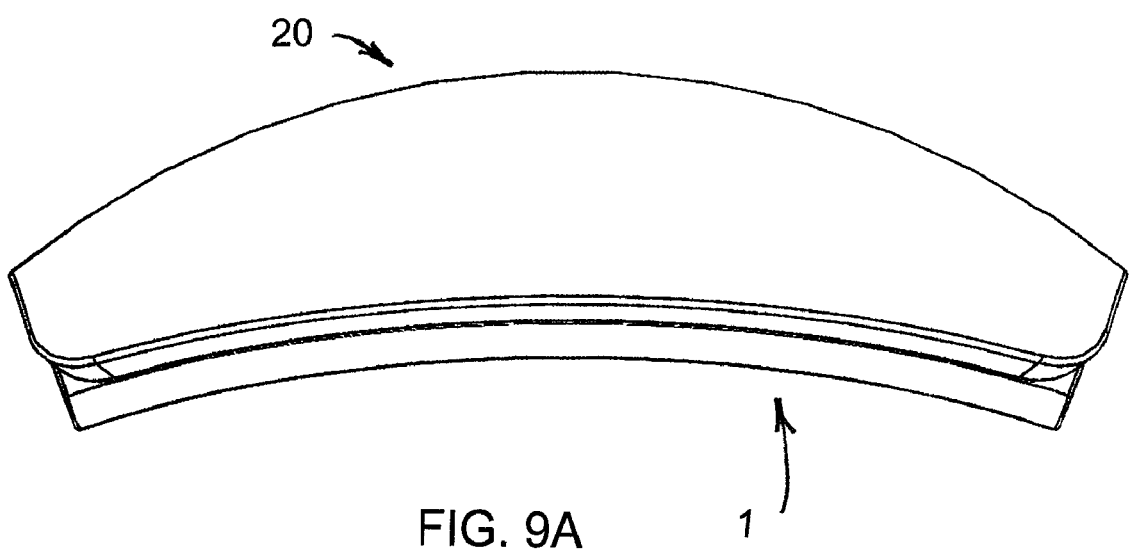
FIGS. 9A-9B are respective side-elevational and side-perspective views of the shaped permanent magnet as seen in FIGS. 5B and 5D, having the dimagnetic cover of FIG. 8 for increasing flux focusing.
Figure 9B:
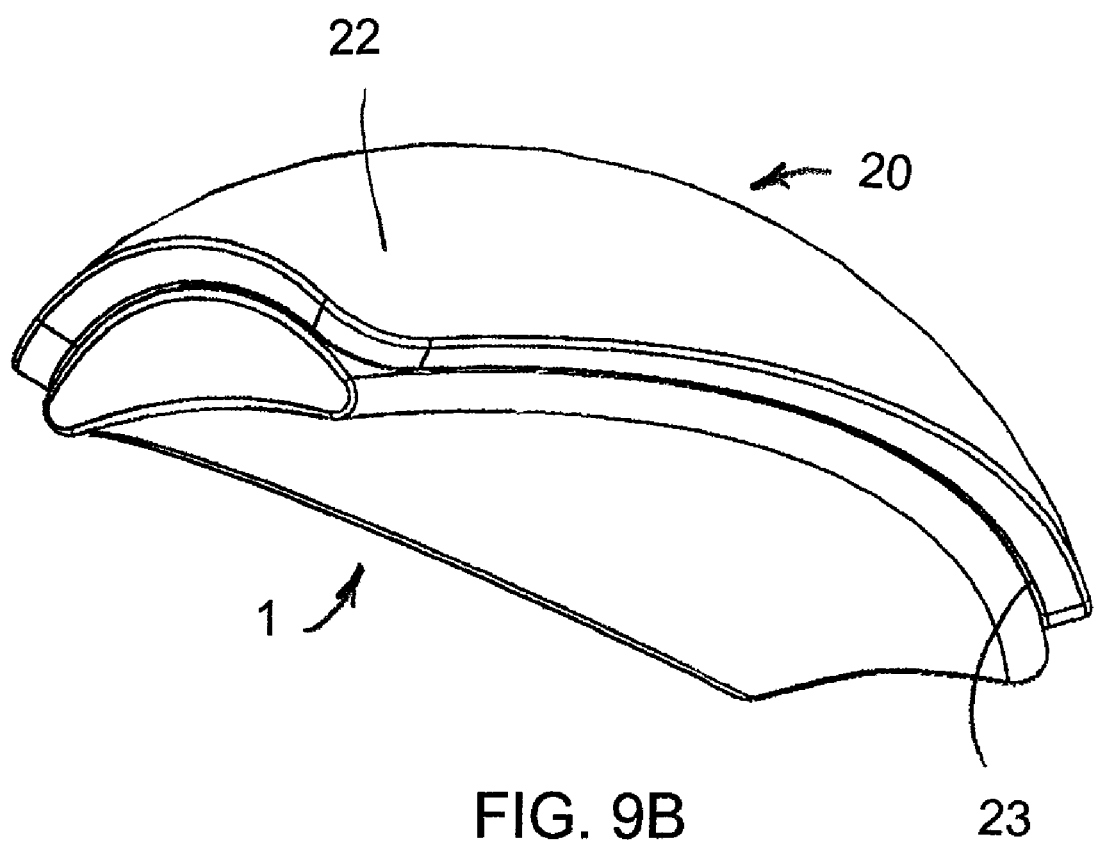
Figure 10A:
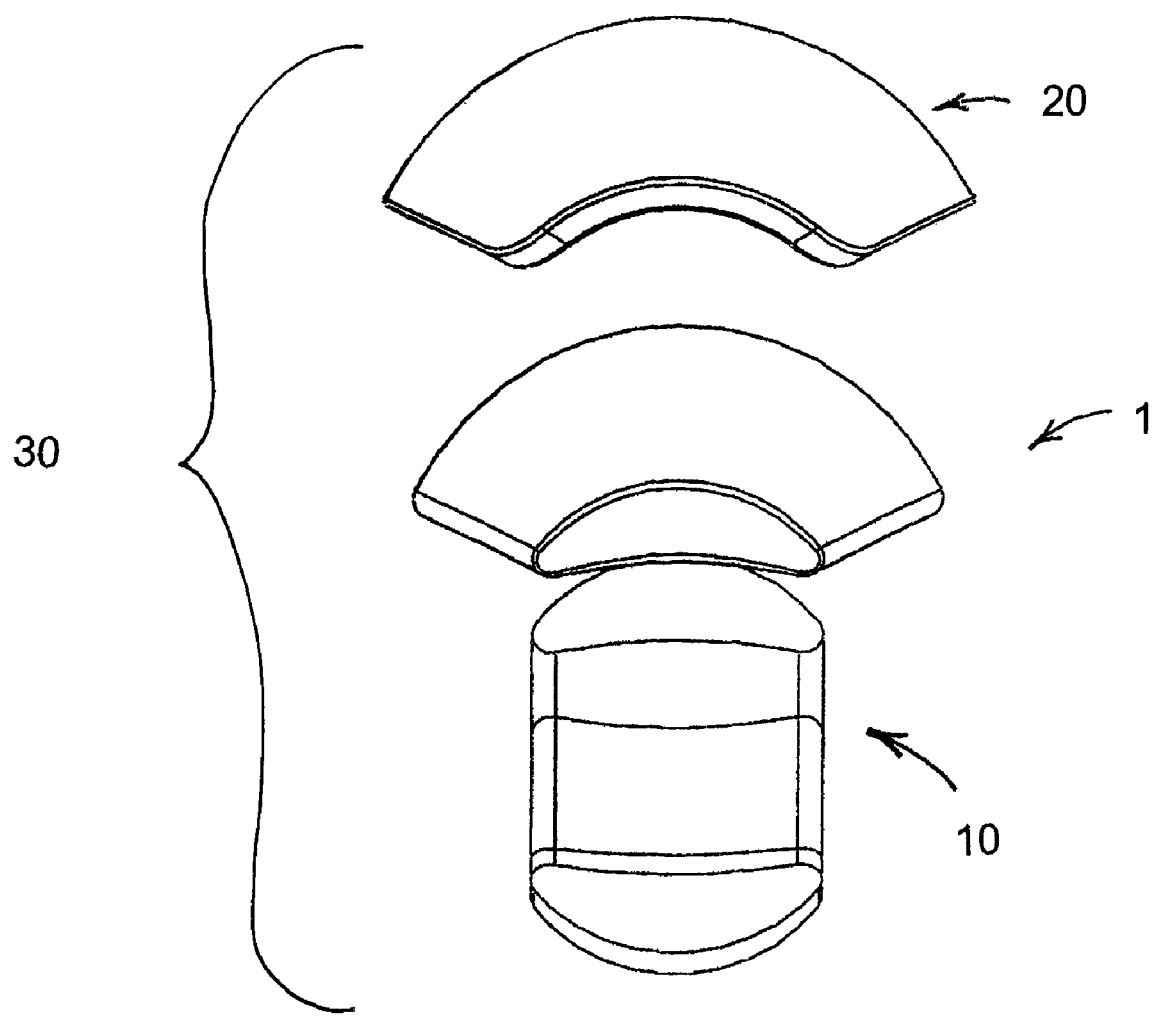
FIGS. 10A-10D are respective exploded end-elevational, left side-elevational, right side-elevational and perspective views of a magnetic unit having the assembly of FIGS. 7A-7B and the dimagnetic cover of FIG. 8.
Figure 10B:
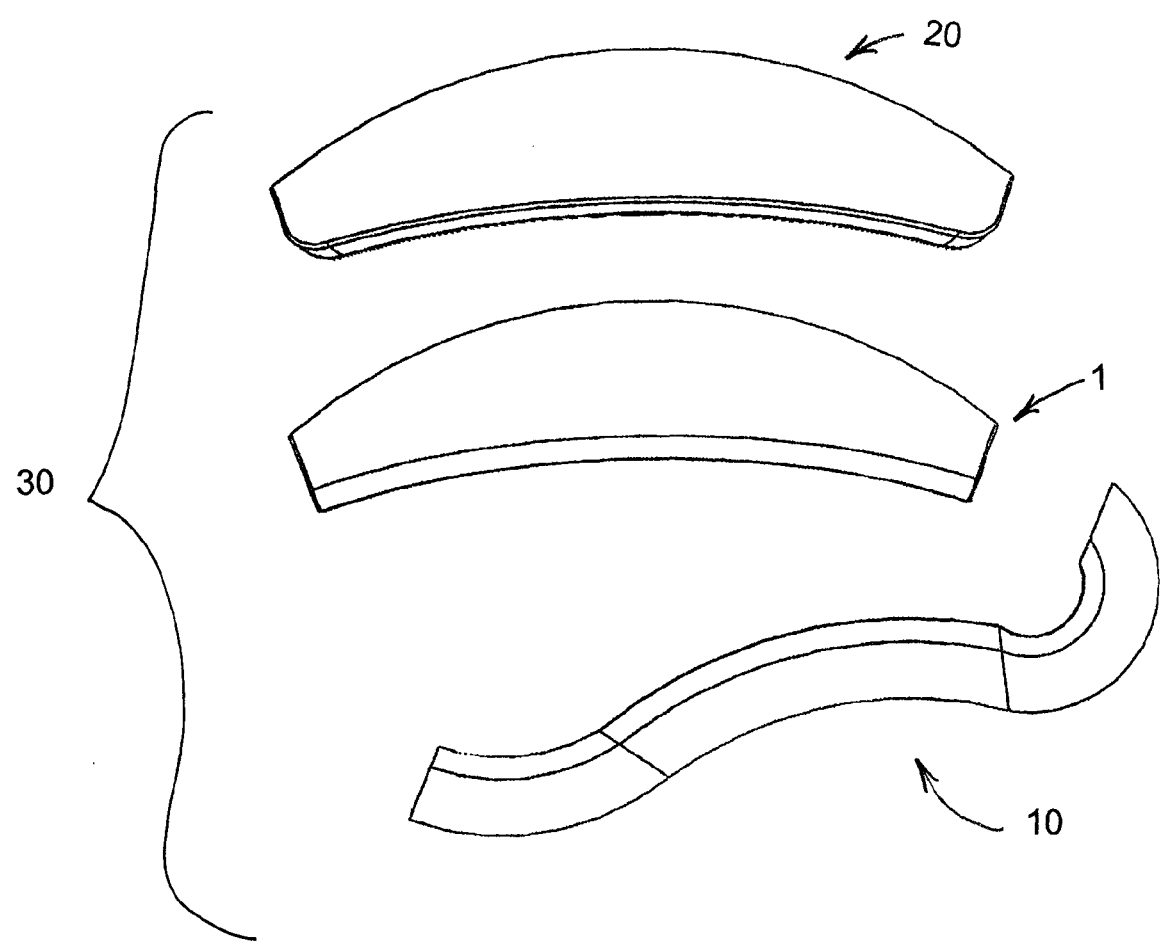
Figure 10C:
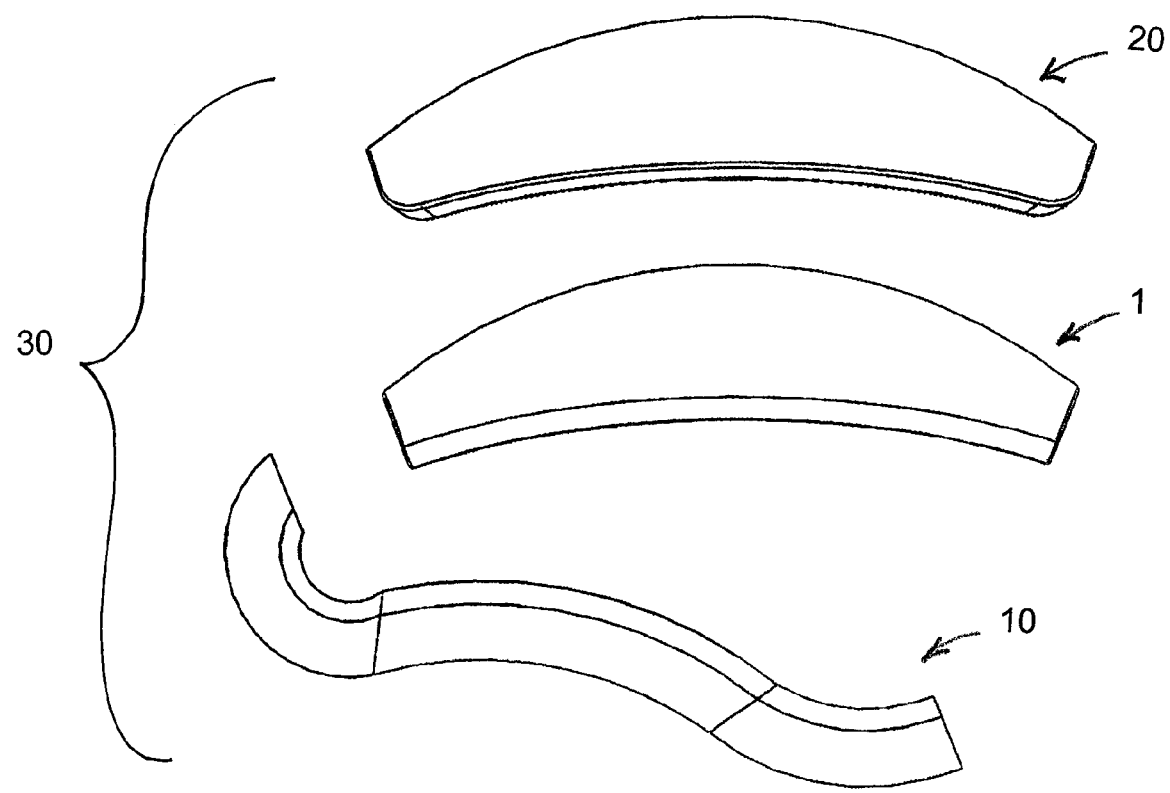
Figure 10D:
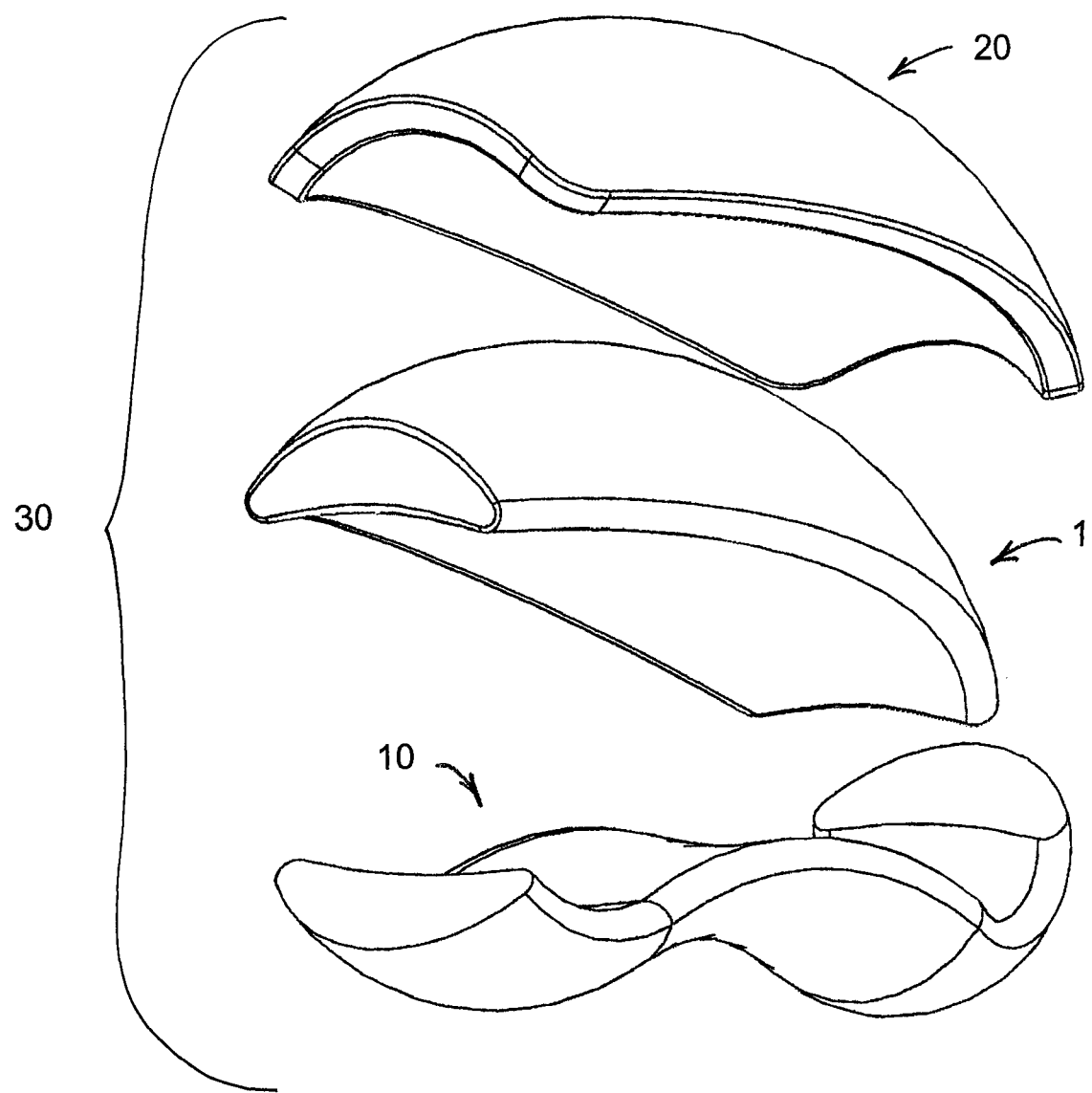

FIG. 8 illustrates a diamagnetic or magnetically resistive material cover 20 of graphite, bismuth metal or other suitable material. As is seen in FIGS. 9A and 9B, the cover 20 has a convex surface 22 and a concave surface 23, which may be placed or formed over the surface 2 at the reduced or low flux side of the shaped permanent magnet 1 for further isolating the flux to the preferred increased flux side and further exaggerating the field asymmetry. This diamagnetic material may be formed with external transverse ridges to further impede the flow by increasing the flux path length. The required pole to pole natural circuit of flux is actually enhanced but guided to the usable asymmetry.

Figure 11A:
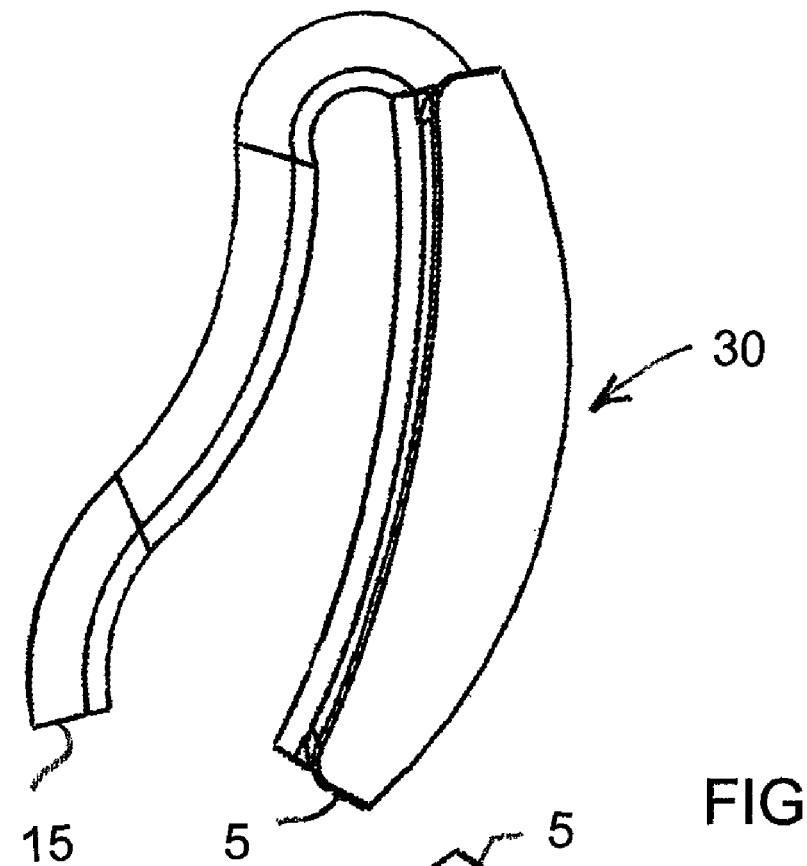
FIGS. 11A-11C are side-elevational views of two of the assembled magnetic units of FIGS. 10A-10D disposed opposite each other and aligned in different positions with regard to their strong and weak flux sides.
Figure 11A:
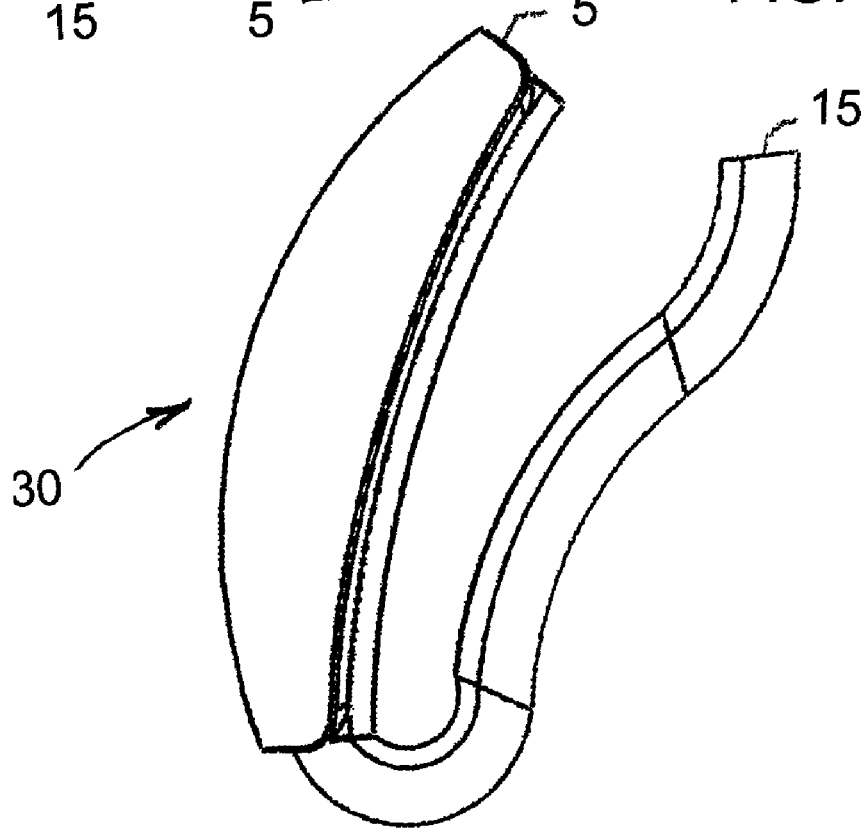
Figure 11B:
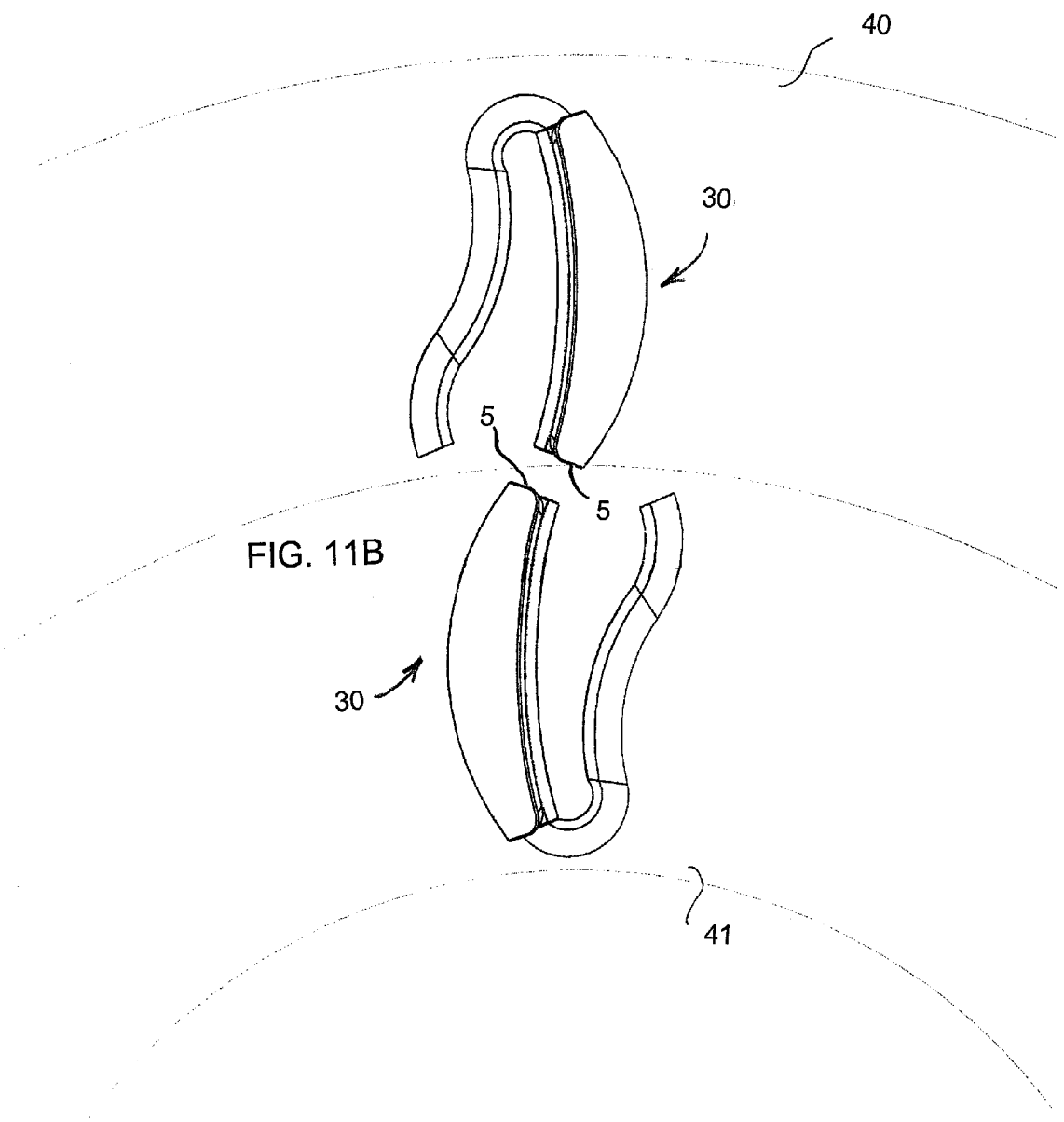
Figure 11C:
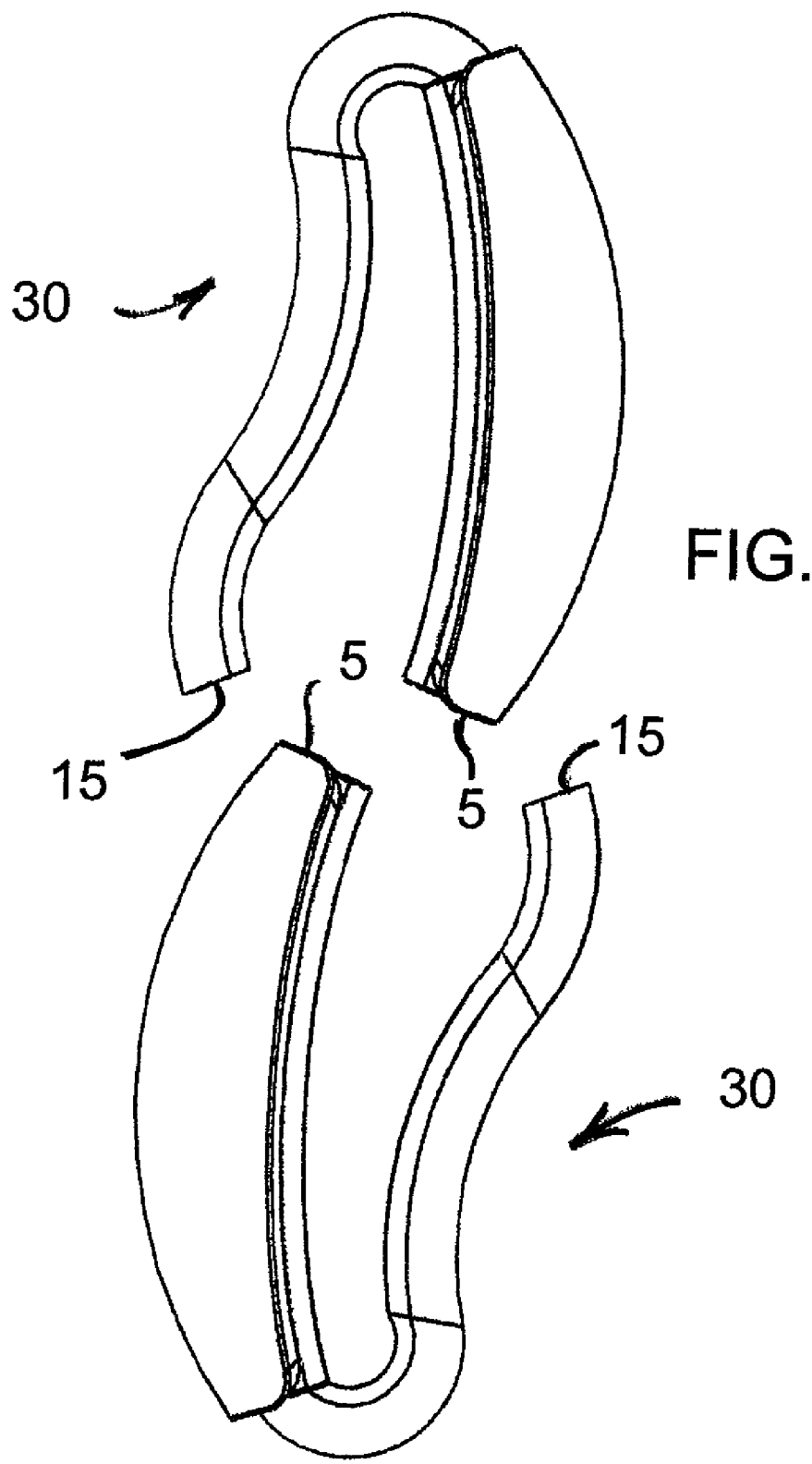

FIGS. 10A-10D are exploded views of a first embodiment of a magnetic unit 30 having the shaped permanent magnet 1, the magnetic flux attracter 10 and the cover 20. FIGS. 11A-11C show two of the assembled magnetic units 30 in different positions relative to each other. In each case, the surfaces 5, 15 of the two units 30 are oriented toward each other. Thus, like poles defined by the surfaces 5 of the magnetic units 30 are approaching each other weak side to weak side in FIG. 11A, are almost directly opposite each other or at a zero repulsion (top dead center) position between approach and departure in FIG. 11B and have passed each other so as to be departing strong side to strong side in FIG. 11C. It is also seen that the upper magnetic unit 30 is disposed on a stationary stator ring 40 while the lower magnetic unit 30 is disposed on a rotor disc 41 rotating within the stator ring 40 in FIG. 11B along mutually rotating surfaces thereof indicated by a parting line 44. The stator 40 and the rotor 41 may be formed of low friction materials, such as plastics, or may be equipped with ball bearings, so that they can slide on each other, but they are preferably spaced slightly apart and mutually rotate without contact.

A focused flux emission is formed from the emitting north pole by separating the flux concentrating pole from the flux attracting permeable material creating an intense projection of magnetic flux for focused repulsion of any opposing like magnetic pole or for controlling magnetically susceptible masses, particles or emitted beams passing through this intensified flux zone. The magnetic pole to permeable material separation, spacing, position, size, angle and magnetic flux density of the assemblies can be varied to project the flux emission at its most effective focus and interaction angle with the passing reverse facing opposing like pole of similar magnetic units 30 or other susceptible masses, particles or beams.

This method and device for focusing magnetic fields overcomes the unusable symmetric field problem and permits the practical use of permanent magnet systems with asymmetric flux fields. This asymmetric flux field magnetic method and assembled device creates an improved and useable, high flux, strong side difference, as compared with an opposing low flux, weak side in a permanent magnet and assembled unit.

If like magnetic poles using this method and units are approaching laterally weak flux side to weak flux side, their repulsive resistances are reduced and since their departures laterally are automatically strong flux side to strong flux side, these departing or propulsive forces are substantially increased, as seen in FIGS. 11A-11C.

The defocused or reduced approach repulsion and the focused or increased departure propulsion are force differences which are can be harnessed in static or moving devices to perform work.

This method of intrinsic flux focusing of permanent magnets and the magnetic units can also improve static devices such as controllers of magnetically susceptible masses, particles or emitted beams using flux fields and moving devices such as electric motors or generators using conventional, non-focused, symmetric field, permanent magnets.

Magnetically driven devices are also created according to the invention by this intrinsic or shape flux focusing of permanent magnets using assemblies of multiple magnetic units.

Figure 12:
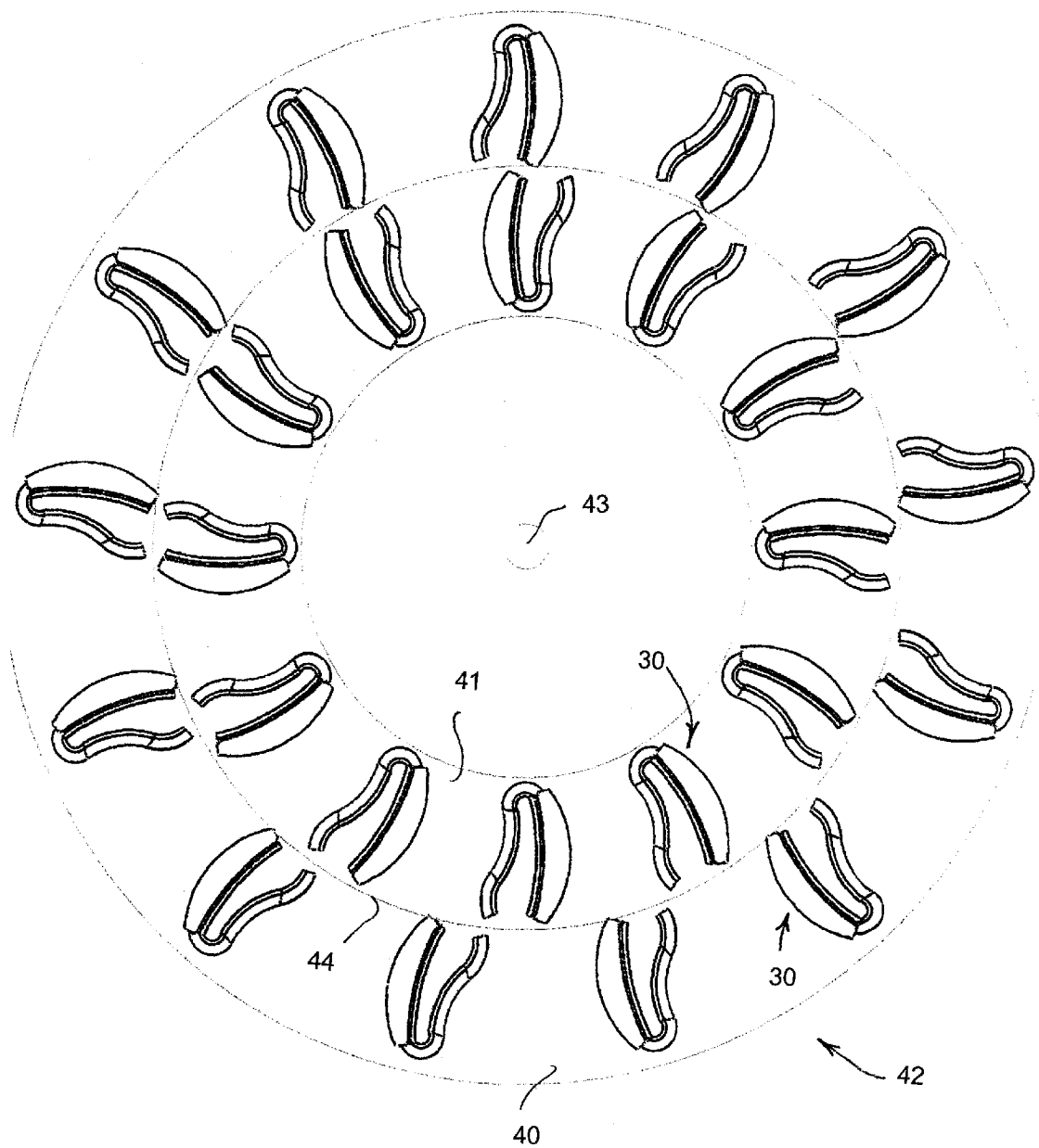
FIG. 12 is a side-elevational view of a device having a stator ring and a rotor disc with the magnetic units of FIGS. 11A-11C.

As is seen in FIG. 12, in the illustrated assembled multiple magnetic unit device 42, the individual assembled magnetic units 30 may be disposed in functionally opposing groups on the stator ring or unit 40 and on the rotor disc or unit 41 with variables such as unit numbers, position, offset timing and angles to maximize propulsion, even out pulse thrusts and prevent attraction lockup in its construction as a self-powered permanent magnet device as the rotor unit 41 rotates about a shaft 43 within the stator unit 40. The magnetic units 30 on the rotor disc 41 and on the stator ring 40 are disposed opposite one another about the mutually rotating surfaces 44, in such a way that the end surfaces 15 of the magnetic flux attracter 10 and the end surfaces 5 of the shaped permanent magnet 1 of each of the magnetic units 30 face the mutually rotating surfaces 44 and thus each other. Thus, the units 30 are turned or offset relative to one another through 180° across the parting line 44.

Once the rotor unit 41 is set into rotation, it will rotate for an extended period of time and eventually slow due to the eventual weakening of the permanent magnets 1. While the rotor unit 41 is rotating, the shaft 43 also rotates and can perform work, such as by driving machinery or an electric generator.

Figure 13A:
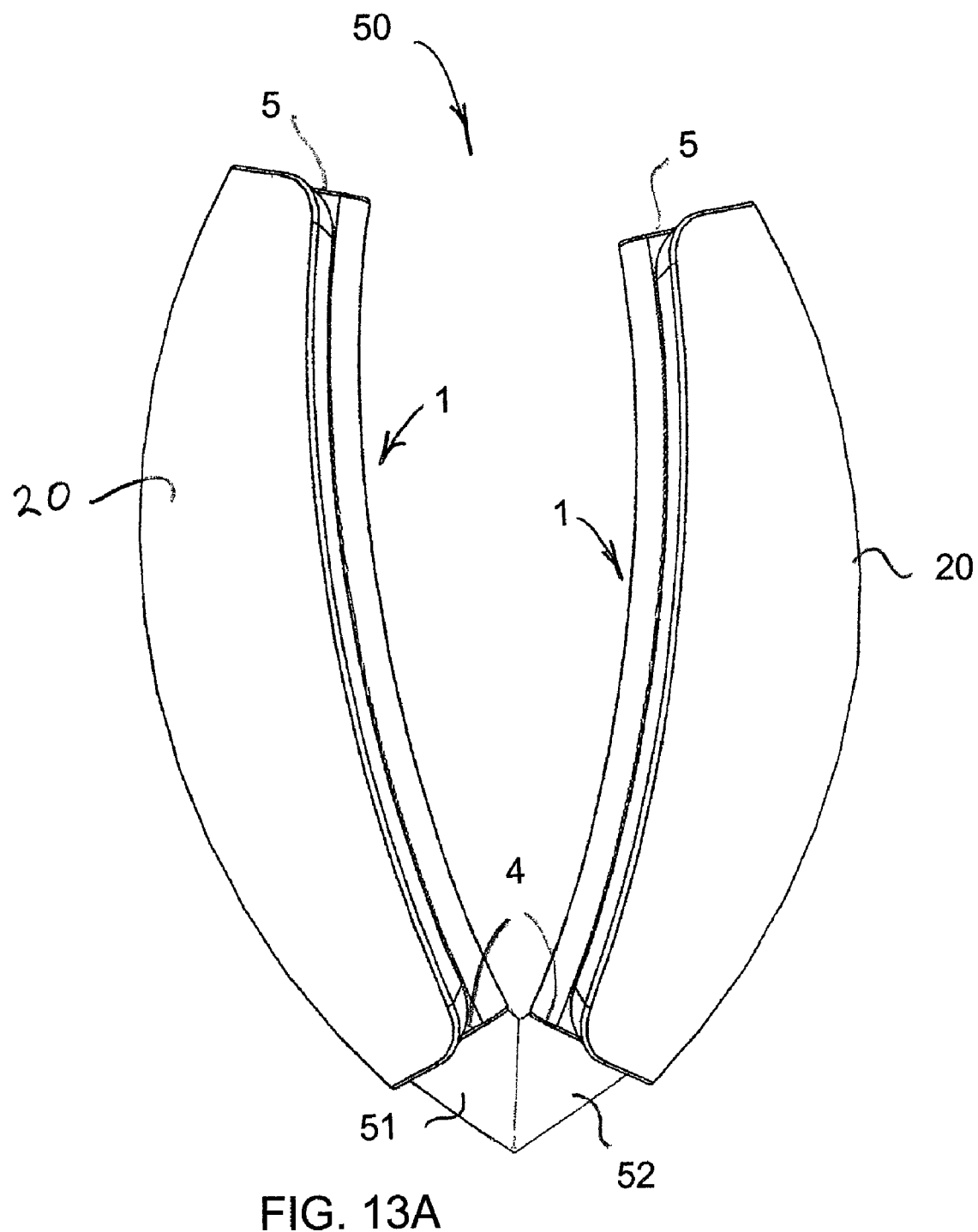
FIG. 13A is a side-elevational view of another embodiment of the invention, in which two shaped permanent magnets as seen in FIGS. 5B and 5D, having the dimagnetic cover of FIG. 8 for increasing flux focusing, are interconnected by two segmented alike permanent magnets to form a magnetic unit which avoids conflict with a conduit channel.

FIG. 13A illustrates a second embodiment of the magnetic unit of the invention which also avoids use of a conduit channel. In the embodiment of the magnetic unit 30 of FIGS. 10A-10D, a shaped permanent magnet, a dimagnetic cover and a flux attracter are provided. In contrast, the magnetic unit 50 of FIG. 13A includes two shaped permanent magnets 1 with dimagnetic covers 20, in which the permanent magnet and cover on the right is shortened as compared to the permanent magnet and cover on the left. The end surfaces 4 of the shaped permanent magnets 1 are also interconnected by two segmented alike permanent magnets 51, 52. Similar to the permanent magnets 1, the permanent magnets 51, 52 are also flux controlling permanent magnets. Therefore, the permeable material of the first embodiment is replaced in the second embodiment with two similar but possibly shorter active permanent magnetic units to further strengthen the projected flux arc.

Figure 13B:
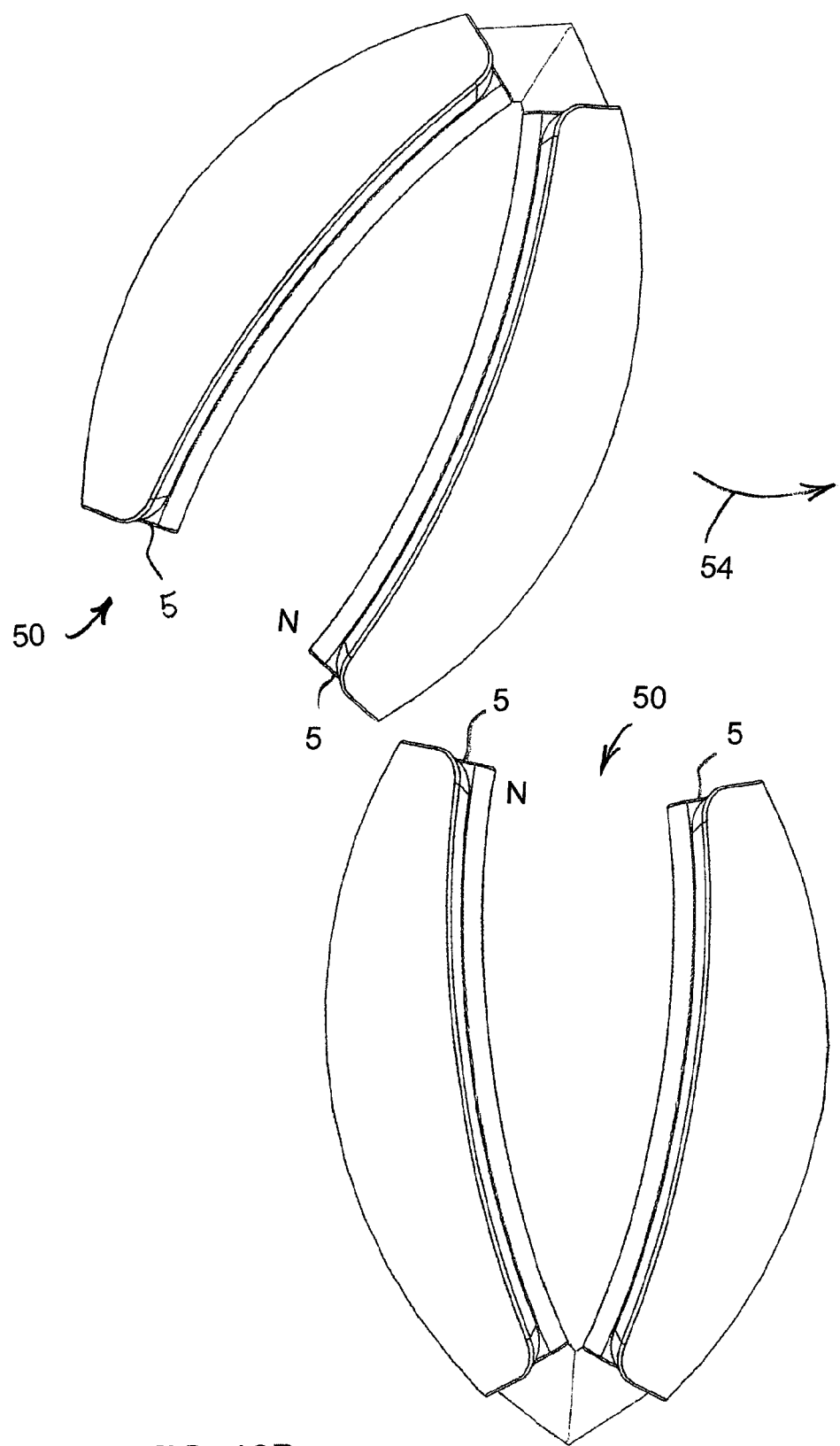
FIGS. 13B-13D are side-elevational views of two of the magnetic units according to FIG. 13A disposed opposite each other and aligned in different positions with regard to their strong and weak flux sides.
Figure 13C:
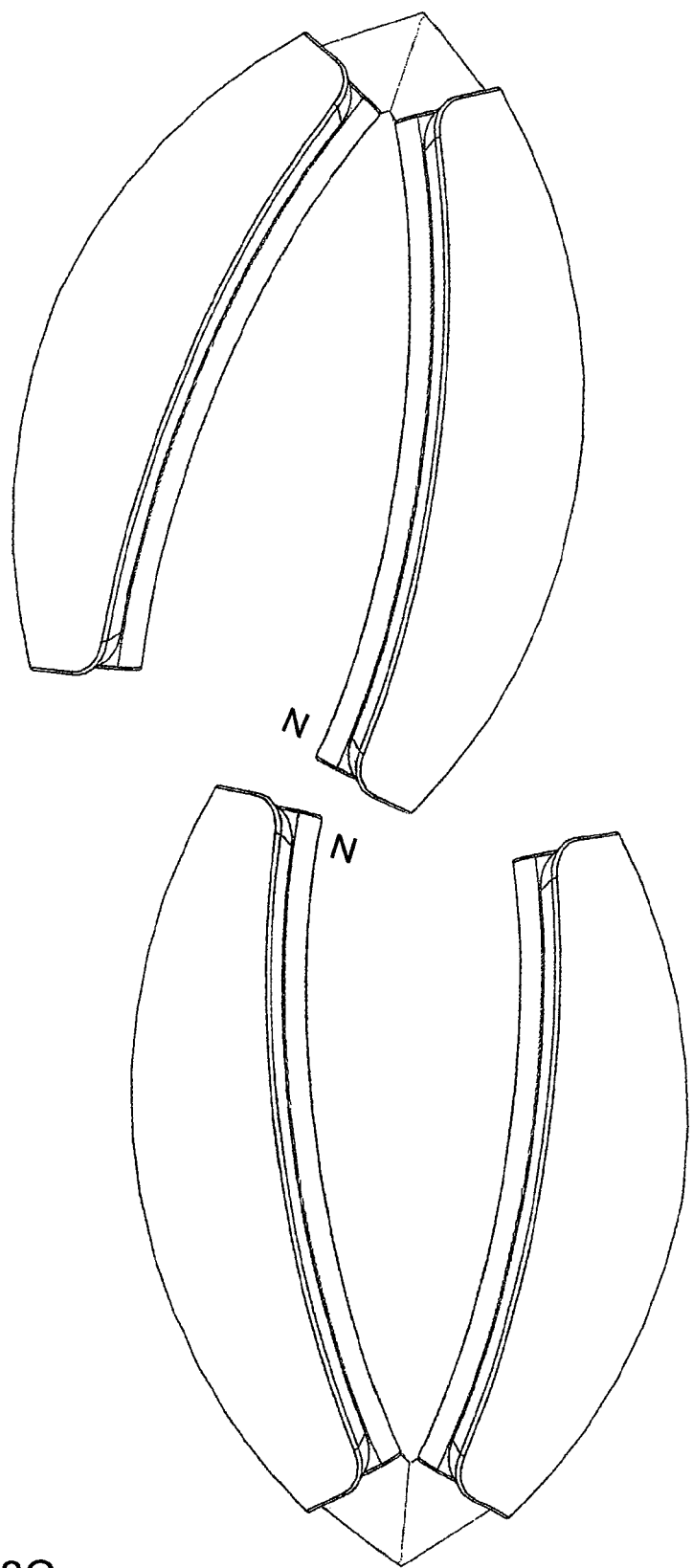
Figure 13D:
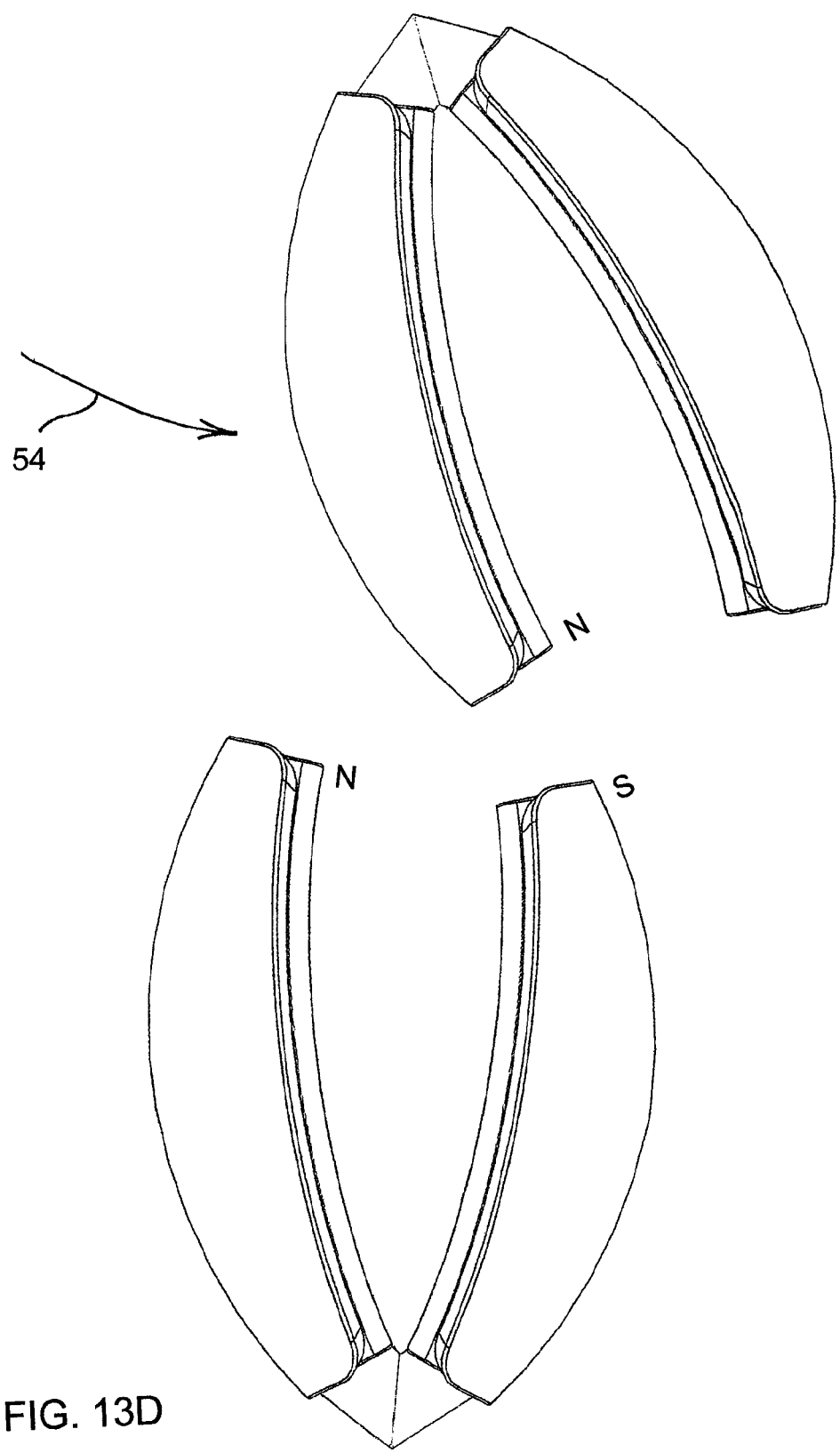

FIGS. 13B-13D show the magnetic units 50 in different positions relative to each other. The magnetic units 50 are in positions similar to the magnetic units 30 at the bottom of FIG. 12. Therefore, the upper unit 50 is a rotor element disposed with other units on a rotor disc 41 which rotates about a shaft 43 in a direction of rotation indicated by an arrow 54, and the lower unit 50 is a stator element disposed with other units on a stationary stator ring 40. The other end surfaces 5 of the shaped permanent magnets 1 which are closest together in FIG. 13B have a weakened maximum repulsion. As the rotor disc or unit 41 rotates into the position shown in FIG. 13C, the other end surfaces 5 of the shaped permanent magnets 1 which are closest together have increased maximum propulsion. Finally, after further rotation, the magnetic units 50 reach an intermediate position with minimal interaction between the like poles of the permanent magnets 1 due to the distance therebetween.

According to the invention, conservation of energy is preserved because energy is first input and efficiently stored within the magnet as aligned magnetic domains and must be recharged upon depletion.

Magnets are composed of infinitely divisible magnetic micro domains, which form larger and larger domains or cooperative columns throughout the magnet.

The magnetic domains according to the invention are formed to be longer and stronger around the periphery and shorter and weaker in the center as a result of the shaping. The curving, tapering and contouring physical changes, causes a direct external flux copying of these physical changes and focuses the corresponding dominant flux field differences into useable flux field asymmetry.

The invention claimed is:

1. A magnetic unit, comprising:
two flux-focused, shaped permanent magnets each having a body of magnetic material with surface contouring to form a reduced flux side with a convex surface and an increased flux side with a concave surface, said surfaces developing high and low resistance external flux paths creating focused asymmetric flux fields, and said body having two magnet pole end surfaces; and
two segmented permanent magnets together interconnecting one of said end surfaces of each of said shaped permanent magnets.

2. The magnetic unit according to claim 1, wherein said bodies of said permanent magnets each have a center of magnetic mass and is curved and tapered to place said center of magnetic mass off-center in said body for creating focused asymmetric flux fields.

3. The magnetic unit according to claim 1, wherein said magnet pole end surfaces of said bodies of said permanent magnets are concave and have angulation and focusing toward said increased flux side, improving asymmetry of the flux fields and projecting and extending flux farther from said increased flux side.

4. The magnetic unit according to claim 1, which further comprises magnetically resistive covers each having a concave surface covering said convex surface of one of said bodies of said magnets for further isolating the flux to said increased flux side and further exaggerating the field asymmetry.

5. The magnetic unit according to claim 1, wherein said concave surface of said bodies of said permanent magnets has matching transverse and lengthwise concave curvatures for concentrating, directionally focusing, maximizing and directing flux lines in converging vectors toward a focal point off said concave surface, improving asymmetry of the flux fields side to side.

6. A kinetic device, comprising:
a stationary stator ring;
a rotor disc rotating within said stator ring and defining mutually rotating surfaces therebetween; and
a multiplicity of said magnetic units according to claim 1 disposed on said rotor disc and on said stator ring;
said magnetic units on said rotor disc and on said stator ring being disposed opposite one another about said mutually rotating surfaces; and
the other of said end surfaces of each of said shaped permanent magnets of each of said magnetic units facing each other.

7. The magnetic unit according to claim 1, wherein said bodies of said permanent magnets each have a relatively longer lengthwise axis and a relatively shorter transverse axis being perpendicular to each other, and said flux paths are focused along said lengthwise axes.

8. The magnetic unit according to claim 1, wherein said two segmented permanent magnets together directly interconnect one of said end surfaces of each of said shaped permanent magnets.

* * * * *